US010069363B2

(12) United States Patent
Yamano

(10) Patent No.: US 10,069,363 B2
(45) Date of Patent: Sep. 4, 2018

(54) ROTARY POWER GENERATING APPARATUS AND ELECTRIC GENERATING APPARATUS

(71) Applicant: Katsushito Yamano, Tokyo (JP)

(72) Inventor: Katsushito Yamano, Tokyo (JP)

( * ) Notice: Subject to any disclaimer, the term of this patent is extended or adjusted under 35 U.S.C. 154(b) by 0 days.

(21) Appl. No.: 15/308,887

(22) PCT Filed: May 1, 2015

(86) PCT No.: PCT/JP2015/063122
§ 371 (c)(1),
(2) Date: Nov. 4, 2016

(87) PCT Pub. No.: WO2015/174303
PCT Pub. Date: Nov. 19, 2015

(65) Prior Publication Data
US 2017/0070114 A1    Mar. 9, 2017

(30) Foreign Application Priority Data

May 13, 2014   (JP) .................................. 2014-099333
Dec. 9, 2014   (JP) .................................. 2014-248544

(51) Int. Cl.
*H02K 7/00*    (2006.01)
*H02K 1/34*    (2006.01)
(Continued)

(52) U.S. Cl.
CPC .................. *H02K 1/34* (2013.01); *F03G 3/00* (2013.01); *F03G 7/10* (2013.01); *H02K 7/075* (2013.01);
(Continued)

(58) Field of Classification Search
CPC ...... H02K 53/00; H02K 7/1815; H02K 7/075; H02K 1/34; F03G 7/10; F03G 3/00
(Continued)

(56) References Cited

U.S. PATENT DOCUMENTS 4,295,070 A * 10/1981 Johansson ............... F02P 1/086
                                              310/153
5,469,004 A * 11/1995 Jachim .................. H02K 7/065
                                              310/24
(Continued)

FOREIGN PATENT DOCUMENTS

JP   H08-168279 A   6/1996
JP   2002-054555 A  2/2002
(Continued)

OTHER PUBLICATIONS

Aug. 11, 2015 International Search Report issued in International Patent Application No. PCT/JP2015/063122.

*Primary Examiner* — C. Gonzalez
(74) *Attorney, Agent, or Firm* — Oliff PLC

(57) ABSTRACT

Obtaining of a secure reciprocation of piston magnets and enhance the continuity to obtain a continuous rotary power. The rotary power generating apparatus has the first, second piston magnet members the first, second connecting rods the crankshaft the first, second guide members and the first, second fixed magnet members and it has the demagnetizing member including the demagnetizing rotating board. The first, second piston magnet members and the first, second fixed magnet members are arranged so that the top pole surfaces and fixed pole surfaces having the same polarity, opposes each other. The demagnetizing rotating board has demagnetizing magnet parts, having magnetic forces weaker than the magnetic poles of the top pole surfaces a and different from the polarity of the top pole surfaces and the non-magnetic force parts.

7 Claims, 29 Drawing Sheets

(51) Int. Cl.
*F03G 3/00* (2006.01)
*F03G 7/10* (2006.01)
*H02K 7/075* (2006.01)
*H02K 7/18* (2006.01)
*H02K 53/00* (2006.01)

(52) U.S. Cl.
CPC ............ H02K 7/1815 (2013.01); H02K 53/00 (2013.01); *Y10S 74/09* (2013.01)

(58) Field of Classification Search
USPC ......... 185/27, 32, 33; 290/1 R, 1 A; 310/46, 310/24, 23
See application file for complete search history.

(56) References Cited

U.S. PATENT DOCUMENTS

| | | | | |
|---|---|---|---|---|
| 8,011,903 B2* | 9/2011 | Pollack | ................. | F04B 17/044 310/15 |
| 2002/0088424 A1* | 7/2002 | Sayama | ................. | B60K 6/24 123/192.2 |
| 2003/0051679 A1* | 3/2003 | Iwata | ................. | B60K 6/24 123/41.31 |
| 2006/0131887 A1* | 6/2006 | Gosvener | ................. | F03G 7/08 290/1 R |
| 2010/0071636 A1* | 3/2010 | Elmaleh | ................. | F02B 63/04 123/2 |
| 2011/0001381 A1* | 1/2011 | McDaniel | ............. | H02K 21/00 310/152 |
| 2011/0175463 A1* | 7/2011 | Ketchersid, Jr. | ....... | H02K 7/075 310/15 |
| 2014/0117786 A1* | 5/2014 | Gosvener | ............... | H02K 33/16 310/23 |
| 2014/0203670 A1* | 7/2014 | Wu | ........................ | H02K 33/10 310/20 |
| 2014/0333166 A1* | 11/2014 | Gardner | ............... | H02K 49/104 310/103 |
| 2015/0091479 A1* | 4/2015 | Spivak | .................... | B60L 11/12 318/139 |

FOREIGN PATENT DOCUMENTS

| | | |
|---|---|---|
| JP | 2011-043157 A | 3/2011 |
| JP | 3180748 U | 1/2013 |

* cited by examiner

Fig.5
(a)
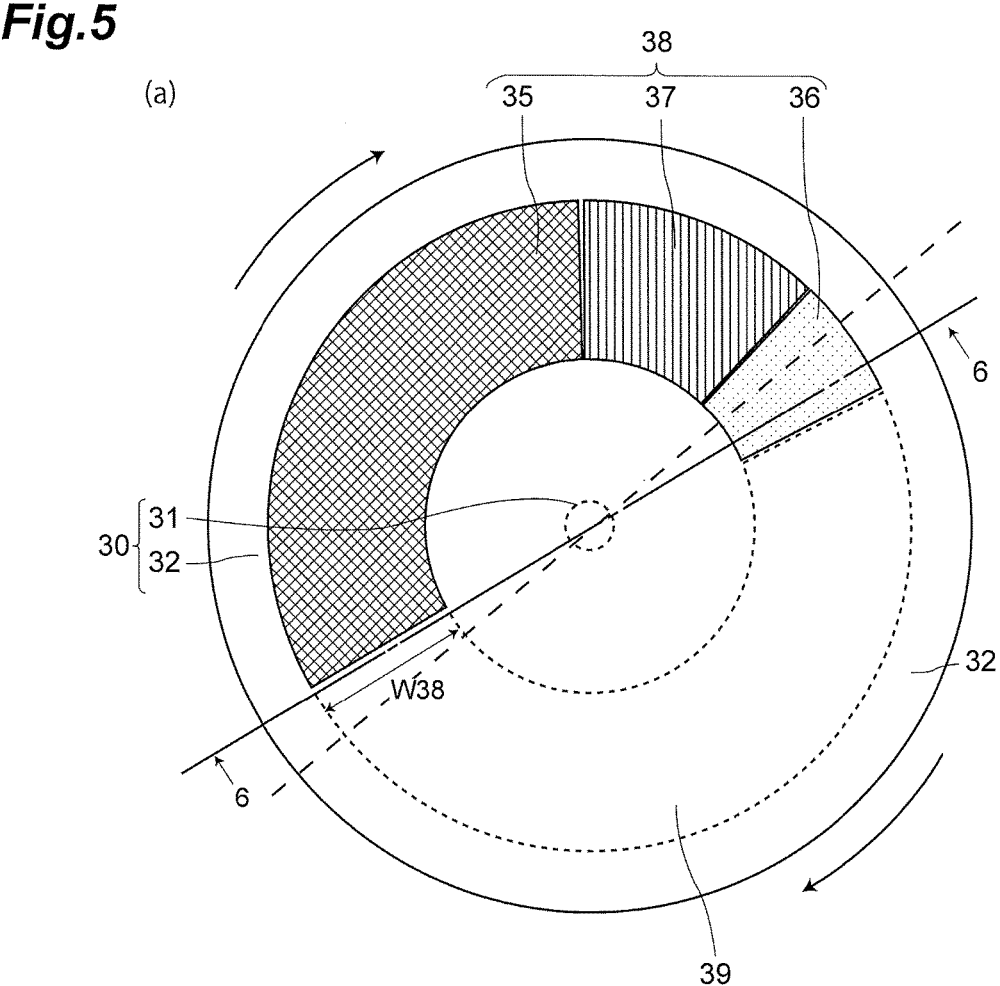
(b)
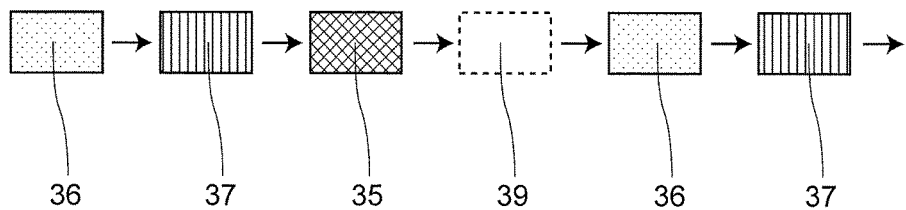

*Fig.11*
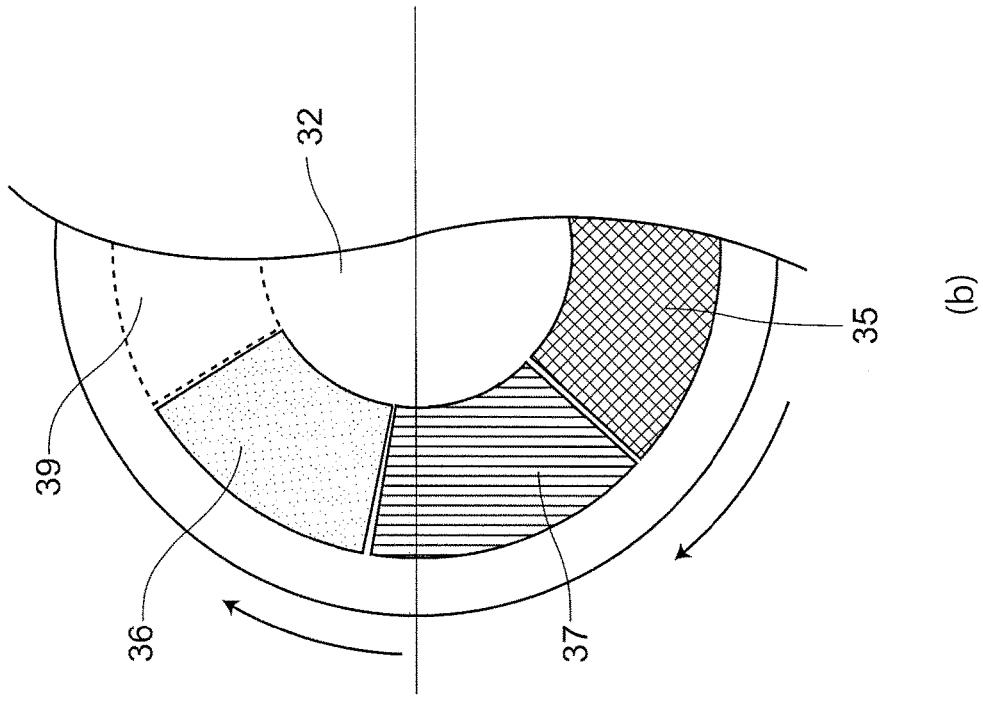
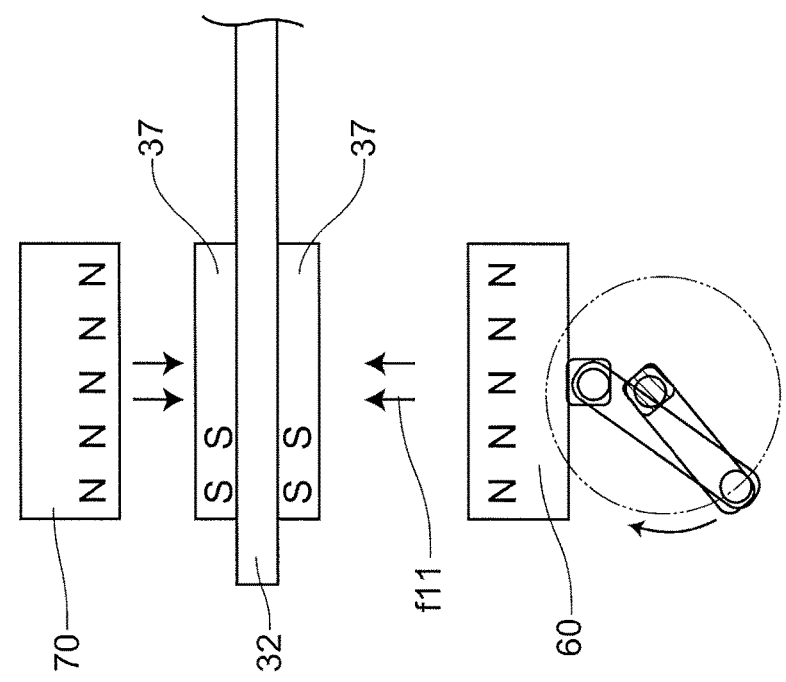

*Fig.12*
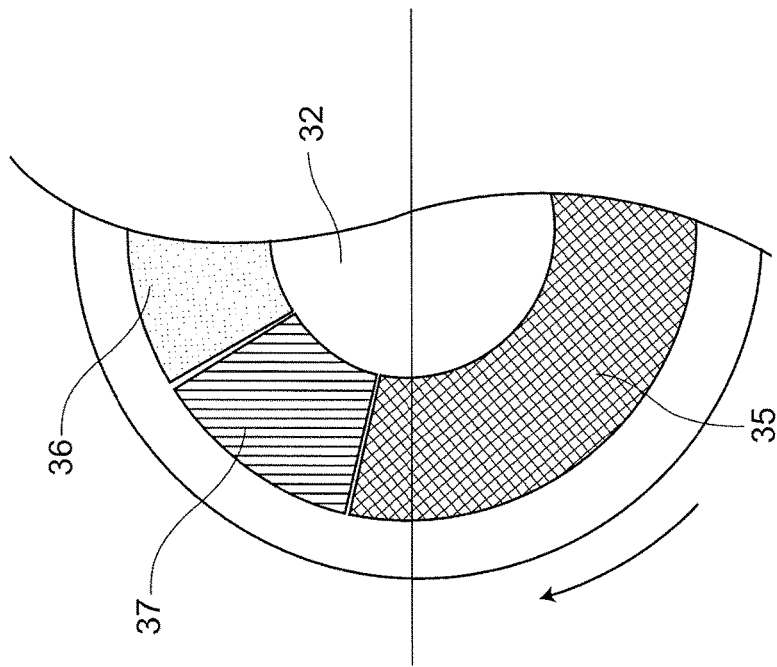
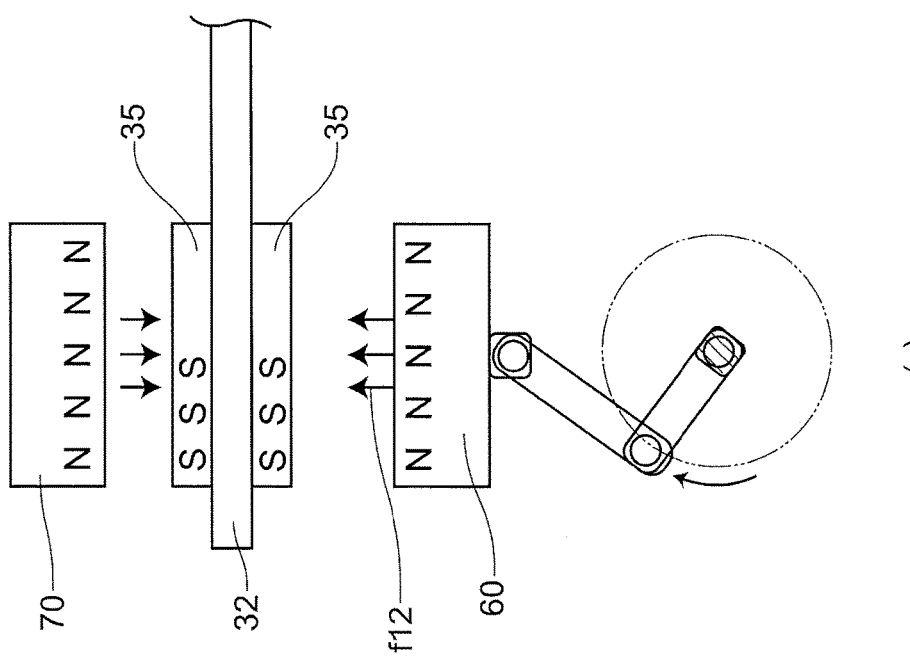

*Fig.18*
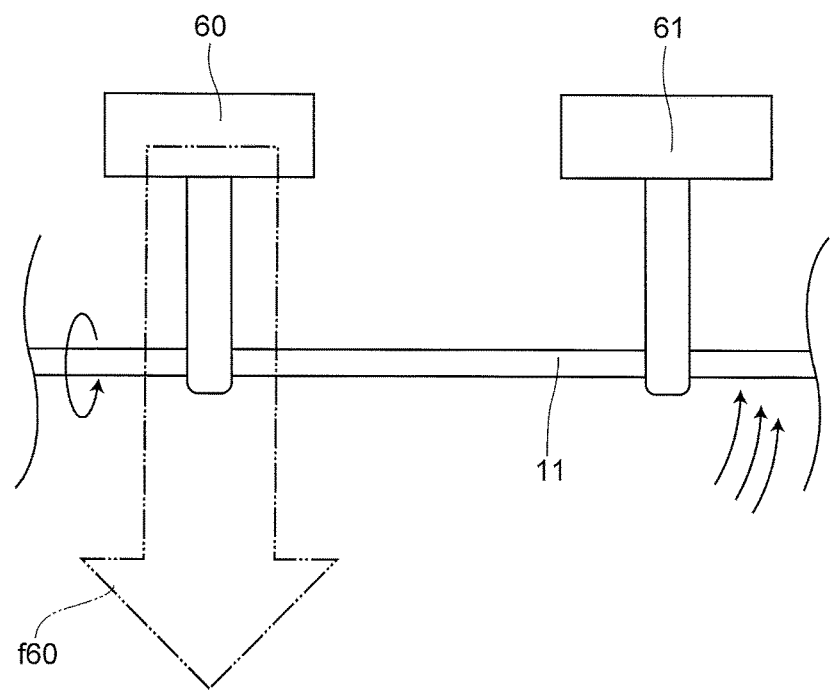
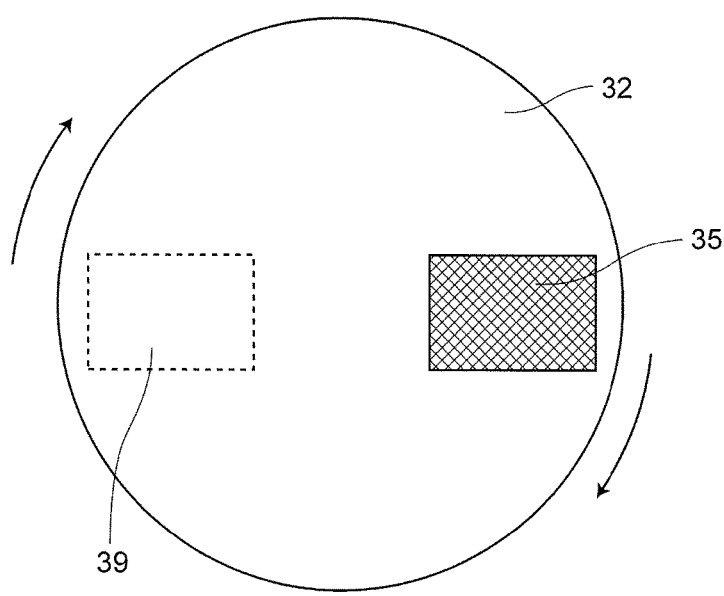

*Fig.19*
(a)
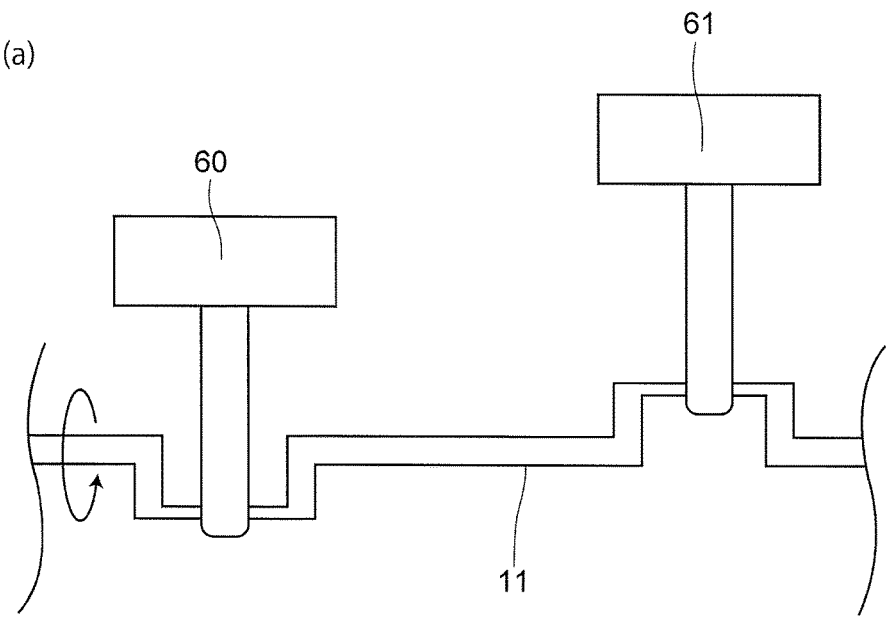
(b)
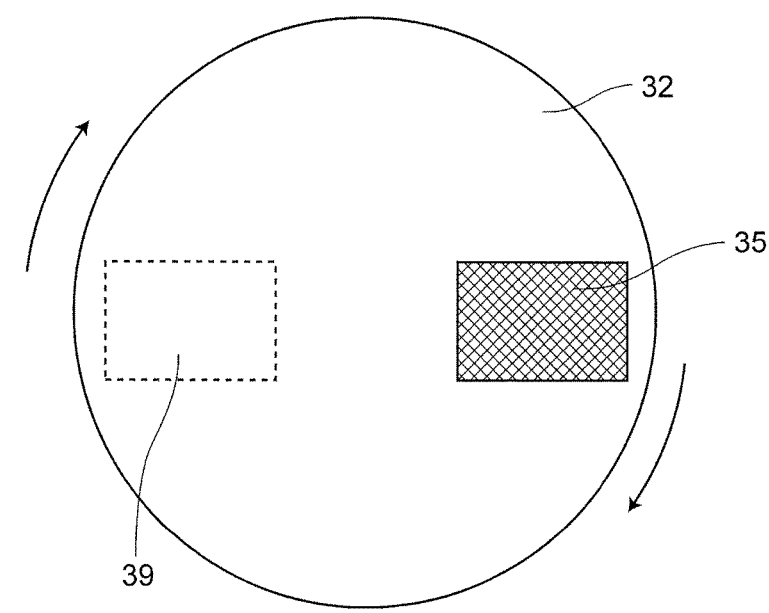

Fig.20
(a)
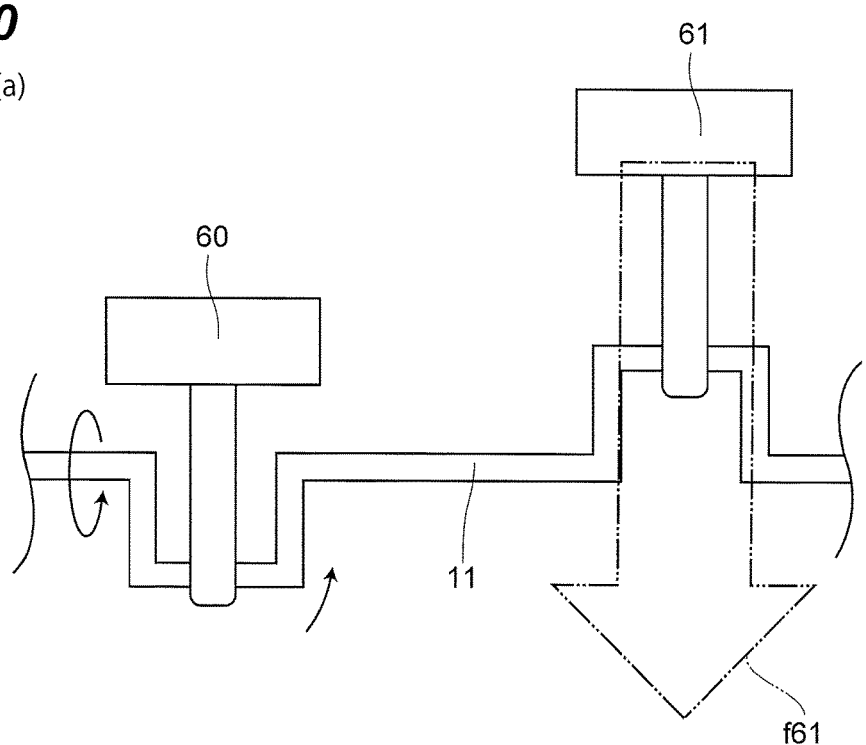
(b)
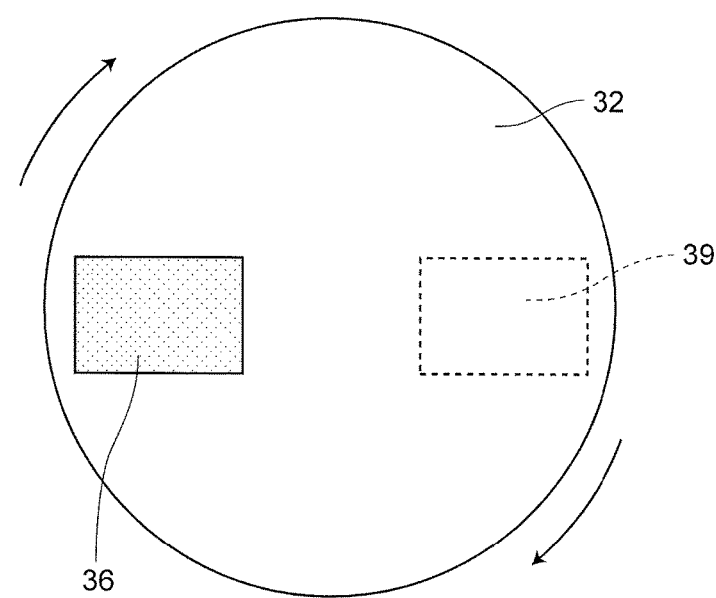

*Fig.25*
Prior Art
(a)
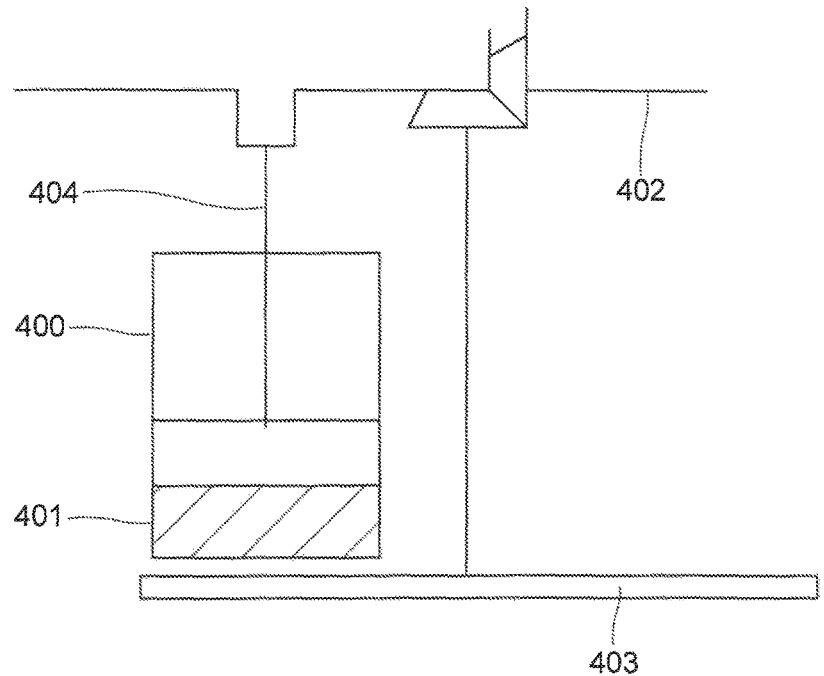
(b)
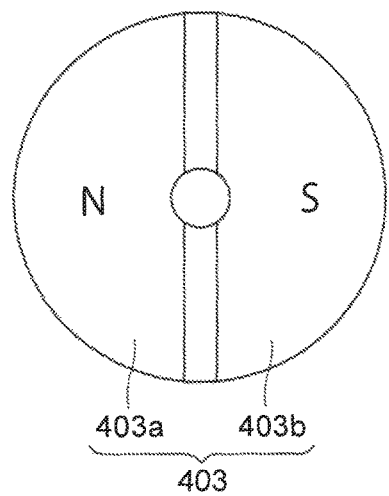

ROTARY POWER GENERATING APPARATUS AND ELECTRIC GENERATING APPARATUS

TECHNICAL FIELD

The present invention relates to a rotary power generating apparatus which generates rotary power utilizing repulsive forces of a permanent magnet and an electric generating apparatus which generates electric power with the rotary power.

BACKGROUND ART

Permanent magnets have property which repulse each other with approach of the same magnetic poles and attract each other with the approach of the different magnetic poles. Formerly, an idea, which a linear motion of a member is generated by utilizing a force which permanent magnets repulse each other (repulsive force) or a force which permanent magnets attract each other (attractive force), and try to convert the linear motion to a rotary motion of another member, is known.

For example, as illustrated in FIG. 24, a magnetic force movement apparatus, having a structure which a piston magnet 301, fixed magnets 302, a connecting rod 303, a crankshaft 304 and coil springs 305 are accommodated in a cylinder 300, is disclosed in patent document 1. The piston magnet 301 and the crankshaft 304 are connected with both sides of the connecting rod 303 respectively, and fixed magnets 302, 302 are accommodated in both sides of top dead center and bottom dead center so as to repulse with the piston magnet 301 each other, and coil springs 305, 305 are accommodated outside of them, in the magnetic force movement apparatus.

Further, as illustrated in FIG. 25(a), a magnetic force applied power unit, having a structure which a piston magnet 401 is accommodated in a cylinder 400, and a crankshaft 402 is arranged outside the cylinder 400, a rotating circular shaped magnet 403 is arranged on the opposite side, is disclosed in patent document 2. In this magnetic force applied power unit, the piston magnet 401 is connected to the crankshaft 402 via a connecting rod 404, and the crankshaft 402 is connected to the circular shaped magnet 403 via a gear and shaft.

Furthermore, as illustrated in FIG. 26, a power transmitting machinery, having a structure which piston magnets 501, 501 are accommodated in cylinders 500, 500, and a crankshaft 502 is arranged outside the cylinders 500, 500, a rotary board 504 having fixed magnets 503, 503 is arranged on the opposite side, is disclosed in patent document 3. In this power transmitting machinery, the piston magnets 501, 501 are connected to the crankshaft 502 via connecting rods 505, 505, and a motor 506 is connected with the rotary board 504.

PRIOR ART DOCUMENTS

Patent Documents

Patent Document 1: JPH 8-168279
Patent Document 2: JP2011-43157
Patent Document 3: Registered Utility Model 3180748
Patent Document 4: JP2002-54555

SUMMARY OF INVENTION

Problem to be Solved by the Invention

As described above, power apparatuses, which a reciprocation of the piston magnet in the cylinder is made by utilizing the repulsive force or the attractive force of the magnet, and try to convert the reciprocation to a rotary motion of the crankshaft, are conventionally known.

By the way, the rotary motion of the crankshaft has to be continuous motion for getting effective rotary motion using these kinds of the power apparatuses. That needs repeated reciprocation of the piston magnet in the cylinder.

However, power apparatuses, disclosed in each above-described patent document, have following problems.

First, in case of the power apparatus disclosed in patent document 1, it is impossible that repulsive forces between the piston magnet 301 and the fixed magnet 302 operate in the same way from both top dead center side and bottom dead center side, because all of the piston magnet 301, the connecting rod 303 and the crankshaft 304 are accommodated in the cylinder 300. Therefore, even if the piston magnet 301 receives repulsive force by the fixed magnet 302 on the top dead center side to move to the bottom dead center side, the piston magnet 301 never return to the top dead center side with receiving similar repulsive force. Therefore, it is impossible to get continuous rotary power, because reciprocation of the piston magnet 301 is not able be obtained.

Further, in case of the power apparatus disclosed in patent document 2, the circular shaped magnet 403 is formed of a combination of the two half-circular shaped magnets 403a, 403b, as illustrated in FIG. 25 (b). However, different poles are disposed on the surface of the same side of the circular shaped magnet 403 in each half-circular shaped magnets 403a, 403b. Then, the rotation of the circular shaped magnet 403 causes operations of the alternate repulsive force and attractive force, thereby it tries to repeat going away and approach of the piston magnet 401.

However, for example, even if the repulsive force operates on the piston magnet 401 from one half-circular shaped magnet 403a, the attractive force operates on the piston magnet 401 from the other half-circular shaped magnet 403b. Therefore, both the repulsive force and attractive force operate on the piston magnet 401 at the same time. Then, when the repulsive force makes the piston magnet 401 go away from the circular shaped magnet 403, the attractive force needs to be stronger than the repulsive force for return of the piston magnet 401 to the original position, because the interval of the piston magnet 401 and the circular shaped magnet 403 extends.

However, that needs repulsive force which is able to overcome the attractive force for going away the piston magnet 401. Eventually, it is impossible to get continuous rotary power, because reciprocation of the piston magnet 401 is not able be obtained by rotation of the circular shaped magnet 403.

Further, in the power transmitting machinery disclosed in patent document 3, the magnets 503, 503 fixed on the rotary board 504 approach to the piston magnets 501, 501 alternately to change polarity of the magnet to operate on the piston magnets 501, 501, thereby it makes the repulsive force and attractive force operate on the piston magnets 501, 501 alternately.

However, even if the power transmitting machinery, operation of the attractive force which is stronger than the repulsive force needs for return of the piston magnets 501, 501, which once gone away, to the original position. Furthermore, because when one piston magnet 501 is attracted by one magnet 503, the other magnet 503 having different polarity tries to go away the piston magnet 501, repulsive force and attractive force due to the magnets 503, 503 collide with each other. Therefore, it is difficult to get continuous reciprocation of the piston magnets 501, 501.

On the other hand, an apparatus, which tries to go away and bring near the piston magnet by repetition of insertion and pulling out of an iron plate between the piston magnet and the fixed magnet whose the same magnetic poles are opposing each other, is disclosed in Patent Document 4.

However, pulling out of the iron plate become to be difficult, because the iron plate is attracted from both the piston magnet and the fixed magnet, when the iron plate is inserted between the piston magnet and the fixed magnet. Further, even if the iron plate is inserted between the piston magnet and the fixed magnet, the iron plate is not able to cut off magnetic force because the iron plate is ferromagnetic substance. So, the reciprocation of the piston magnet is not able to be obtained.

Further, following problem has not been solved because the surfaces of the piston magnet and the fixed magnet which oppose each other (opposing surface) are arranged in parallel.

In general, lines of magnetic force, which appear from the permanent magnet, draw loop-shaped lines illustrated in FIG. 27. Therefore, if opposing surfaces 601a, 602a having same magnetic pole (N-pole in FIG. 28) of the fixed magnet 601 and the piston magnet 602 are opposing in parallel, repulsive forces having the same strength operate in X direction and Y direction, as illustrated in FIG. 28. Then, because the piston magnet 602 is connected to the rotating crankshaft, when the piston magnet 602 leaves from the closest position to the fixed magnet 601, the opposing surfaces 602a moves so as to move an extremely little in parallel along the opposing surfaces 601a.

Then, when the opposing surface 601a and the opposing surface 602a approach each other with keeping parallel condition, the repulsive forces operate in the direction which they try to go away both the fixed magnet 601 and the piston magnet 602 along the central axis direction though, the repulsive forces do not operate easily in the direction which the opposing surface 602a moves in parallel along the opposing surfaces 601a. Therefore, because the effective repulsive forces do not operate easily to the motion which the piston magnet 602 tries to go away from the fixed magnet 601, it is difficult to continue the reciprocation.

As described above, because the reciprocation of the piston magnet is not able to be obtained from the above-described conventional power apparatuses, there is a problem which continuous rotary power is not able to be obtained.

The present invention is made to solve the above problems, and it is an object to provide a rotary power generating apparatus which the reciprocation of the piston magnet is able to be obtained surely and the continuity of the reciprocation is able to be enhanced, thereby the continuous rotary power is able to be obtained, and the electric generating apparatus which generates electric power with the rotary power.

Means for Solving the Problem

To solve the above problem, the present invention is a rotary power generating apparatus including: a first piston magnet member and a second piston magnet member arranged so that their polarities of magnetic poles of a top dead center side are equal and top pole surfaces of the top dead center side face the same direction; a first connecting rod and a second connecting rod connected with the bottom dead center side of the respective first, second piston magnet members; a crankshaft connected with the first, second connecting rods; a first guide member and a second guide member, which hold respectively the first, second piston magnet members from outside and guide the respective first, second piston magnet members during all process of reciprocation; a first fixed magnet member and a second fixed magnet member fixed on the positions to keep a constant interval from the top pole surfaces of the respective first, second piston magnet members, and in which fixed pole surfaces, having the same polarity with the magnetic pole of the top pole surfaces, are arranged so as to oppose the top pole surfaces of the respective first, second piston magnet members; and a demagnetizing member arranged between the top pole surfaces of the first, second piston magnet members and the fixed pole surfaces of the first, second fixed magnet members, and having a demagnetizing rotating board opposing the top pole surfaces both of the first, second piston magnet members, the demagnetizing rotating board includes demagnetizing magnet parts and non-magnetic force parts arranged both of a lower surface opposing the top pole surfaces and upper surface opposing the fixed pole surfaces, the demagnetizing magnet parts have magnetic forces weaker than the magnetic poles of the first, second piston magnet members and having different polarity from the top pole surfaces, the non-magnetic force parts, having no magnetic force, are formed adjacent to the demagnetizing magnet parts, and oppose to only one of the first, second piston magnet members; the rotary power generating apparatus including: a repulsive force unequal structure which a hindmost interval, arranged hindmost position along a rotating direction which the crankshaft rotates, is spread than an interval of another part to weaken a repulsive force repulsing the top pole surfaces and the fixed pole surfaces in the hindmost position than the repulsive force in another part, in the top pole surfaces of the respective first, second piston magnet members and the fixed pole surfaces of the respective first, second fixed magnet members; the rotary power generating apparatus further including: an auxiliary motor supplying power to the crankshaft so that reciprocation of the first, second piston magnet members become continuous.

In the above-described rotary power generating apparatus, repulsive force operates between the first, second piston magnet members and the first, second fixed magnet members, and the repulsive force is able to be reduced with the demagnetizing rotating board.

Further, in case of the above-described rotary power generating apparatus, it is possible that the demagnetizing magnet parts includes a strong demagnetizing part having a strongest magnetic force, a weak demagnetizing part having a weakest magnetic force, a middle demagnetizing part having magnetic force in the middle of the strong demagnetizing part and the weak demagnetizing part, and a magnetic force changing structure which the strong demagnetizing part, middle demagnetizing part and weak demagnetizing part are arranged sequentially along the rotating direction of the demagnetizing rotating board so that the magnetic force changes to become strong gradually along the peripheral direction, the demagnetizing rotating board is formed so that the strong demagnetizing part and the non-magnetic force part oppose respectively one of the first, second piston magnet members.

Further, in case of the above-described rotary power generating apparatus, it is possible that the demagnetizing member has a rotating shaft rotates the demagnetizing rotating board around the center, the demagnetizing member includes bevel gears formed on the edge part of the rotating shaft and the crankshaft respectively, and the bevel gears engage with each other, the bevel gears are formed so that the first, second piston magnet members reciprocate respectively inside the first, second guide members during one rotating of the demagnetizing rotating board in the rotating shaft; the bevel gear of the demagnetizing member engages with the bevel gear of the crankshaft so that the second piston magnet member reaches the bottom dead center at the moment when the first piston magnet member reaches the top dead center, and immediately after that, in the demagnetizing rotating board, a part between the first piston magnet member and the first fixed magnet member changes from the demagnetizing magnet parts to the non-magnetic force parts, and the demagnetizing magnet parts are arranged between the second piston magnet member and the second fixed magnet member.

Furthermore, in case of the above-described rotary power generating apparatus, it is preferable that the first, second guide members have a gap part, connecting inside with outside, formed in all range of reciprocation of the first, second piston magnet members.

Further, it is preferable that the demagnetizing rotating board includes a circular band-shaped structure which the demagnetizing magnet parts and the non-magnetic force parts are formed in circular band-shape.

Further, it is possible that the first, second piston magnet members respectively includes holding cases having a size of being accommodated inside the first, second guide members, and permanent magnets being fitted inside the holding cases without gap, the first, second fixed magnet members respectively includes for-fixing holding cases having the same size with the holding cases, and permanent magnets being fitted inside the for-fixing holding cases without gap, the first, second fixed magnet members are fixed with a adjusting member for adjusting a mounting state of the for-fixing holding cases.

Further, in case of the above-described rotary power generating apparatus, it is preferable that the rotary power generating apparatus including: a first engine part, second engine part respectively having the first, second guide members, the first, second piston magnet members, the first, second fixed magnet members, the first, second connecting rods, the demagnetizing member and the crankshaft, the crankshaft of the first engine part and the crankshaft of the second engine part are formed with a common crankshaft being common to the first, second engine part.

Further, the present invention provides an electric generating apparatus including: a rotary power generating apparatus; and a generator, which generates an electric power with a rotary power generated by the rotary power generating apparatus, the rotary power generating apparatus including: a first piston magnet member and a second piston magnet member arranged so that their polarities of magnetic poles of a top dead center side are equal and top pole surfaces of the top dead center side face the same direction; a first connecting rod and a second connecting rod connected with the bottom dead center side of the respective first, second piston magnet members; a crankshaft connected with the first, second connecting rods; a first guide member and a second guide member, which hold respectively the first, second piston magnet members from outside and guide the respective first, second piston magnet members during all process of reciprocation; a first fixed magnet member and a second fixed magnet member fixed on the positions to keep a constant interval from the top pole surfaces of the respective first, second piston magnet members, and in which fixed pole surfaces, having the same polarity with the magnetic pole of the top pole surfaces, are arranged so as to oppose the top pole surfaces of the respective first, second piston magnet members; and a demagnetizing member arranged between the top pole surfaces of the first, second piston magnet members and the fixed pole surfaces of the first, second fixed magnet members, and having a demagnetizing rotating board opposing the top pole surfaces both of the first, second piston magnet members, the demagnetizing rotating board includes demagnetizing magnet parts and non-magnetic force parts arranged both of a lower surface opposing the top pole surfaces and upper surface opposing the fixed pole surfaces, the demagnetizing magnet parts have magnetic forces weaker than the magnetic poles of the first, second piston magnet members and having different polarity from the top pole surfaces, the non-magnetic force parts, having no magnetic force, are formed adjacent to the demagnetizing magnet parts, and oppose to only one of the first, second piston magnet members; the rotary power generating apparatus including: a repulsive force unequal structure which a hindmost interval, arranged hindmost position along a rotating direction which the crankshaft rotates, is spread than an interval of another part to weaken a repulsive force repulsing the top pole surfaces and the fixed pole surfaces in the hindmost position than the repulsive force in another part, in the top pole surfaces of the respective first, second piston magnet members and the fixed pole surfaces of the respective first, second fixed magnet members; the rotary power generating apparatus further including: an auxiliary motor supplying power to the crankshaft so that reciprocation of the first, second piston magnet members become continuous.

Effect of the Invention

As described above, the present invention provides the rotary power generating apparatus which the reciprocation of the piston magnet is able to be obtained surely and the continuity is able to enhanced, and thereby continuous rotary power is able to be obtained, and the present invention provides the electric generating apparatus which generates electric power with the rotary power.

BRIEF DESCRIPTION OF DRAWINGS

FIG. 5 (a) is a plan view illustrating the demagnetizing member, FIG. 5 (b) is a view illustrating a changing pattern of a demagnetizing magnet part and non-magnetic force part in the demagnetizing member;

FIG. 11 (a) is a view schematically illustrating the first piston magnet member, the first fixed magnet member and the demagnetizing rotating board subsequent to those in FIG. 10 (a), FIG. 11 (b) is a view schematically illustrating the principal part of the demagnetizing rotating board subsequent to that in FIG. 10 (b);

FIG. 12 (a) is a view schematically illustrating the first piston magnet member, the first fixed magnet member and the demagnetizing rotating board subsequent to those in FIG. 11 (a), FIG. 12 (b) is a view schematically illustrating the principal part of the demagnetizing rotating board subsequent to that in FIG. 11 (b);

FIG. 18 (a) is a view schematically illustrating the first, second piston magnet members and the crankshaft subsequent to those in FIG. 17 (a), FIG. 18 (b) is a view schematically illustrating the demagnetizing rotating board subsequent to that in FIG. 17 (b);

FIG. 19 (a) is a view schematically illustrating the first, second piston magnet members and the crankshaft subsequent to those in FIG. 18 (a), FIG. 19 (b) is a view schematically illustrating the demagnetizing rotating board subsequent to that in FIG. 18 (b);

FIG. 20 (a) is a view schematically illustrating the first, second piston magnet members and the crankshaft subsequent to those in FIG. 19 (a), FIG. 20 (b) is a view schematically illustrating the demagnetizing rotating board subsequent to that in FIG. 19 (b);

FIG. 25 (a) is a view illustrating the conventional magnetic force applied power unit, FIG. 25 (b) is a view illustrating the circular shaped magnet;

DESCRIPTION OF EMBODIMENTS

In the following, embodiments of the present invention will be described with reference to the drawings. Note that the same components will be referred to with the same numerals or letters, while omitting their overlapping descriptions.

(Structure of Rotary Power Generating Apparatus)

To begin with, the structure of the rotary power generating apparatus according to the embodiment of the present invention will be explained with reference to FIG. 1 to FIG. 9.

Figure 1:
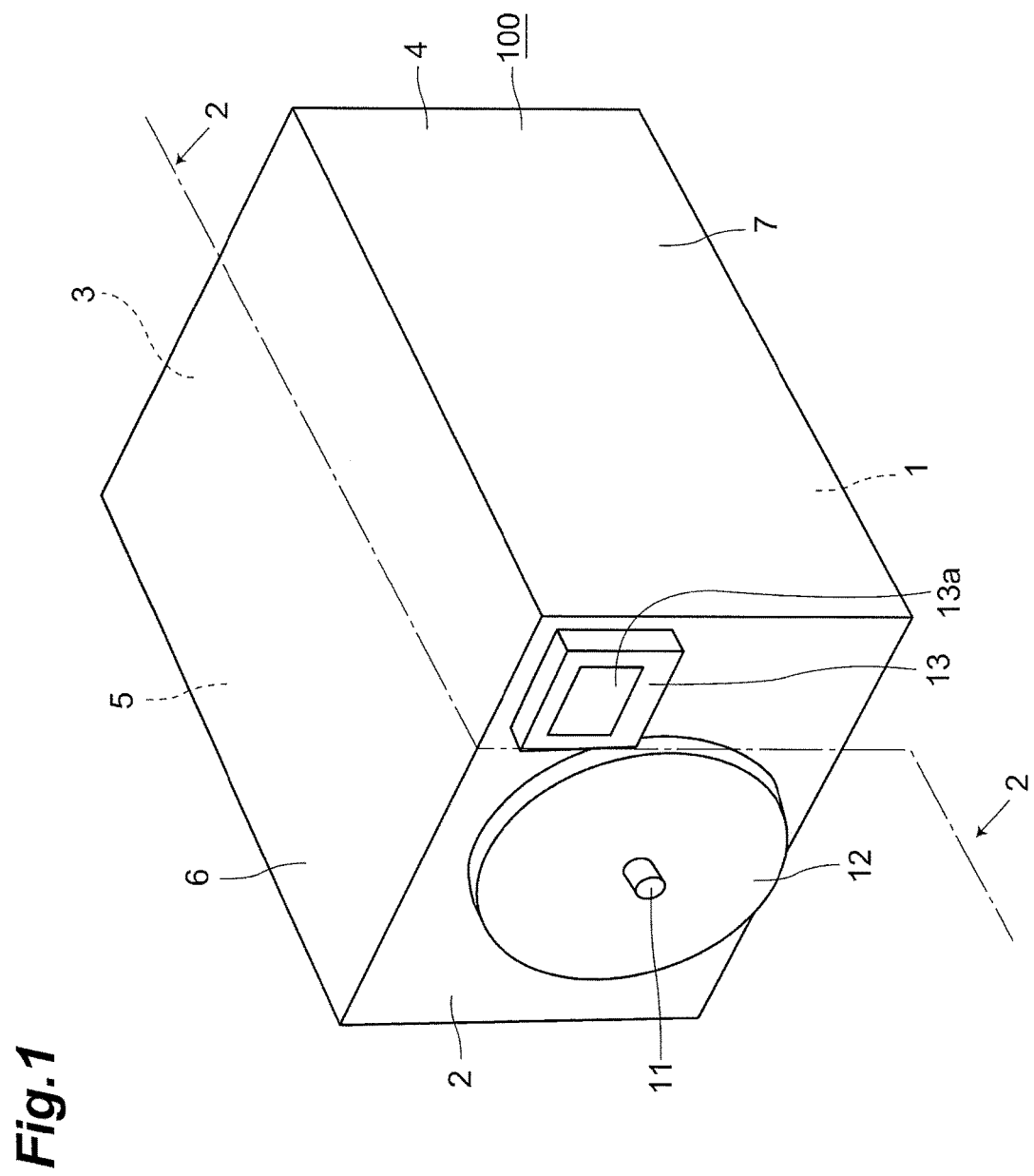
FIG. 1 is a perspective view illustrating the rotary power generating apparatus according to an embodiment of the present invention.
Figure 2:
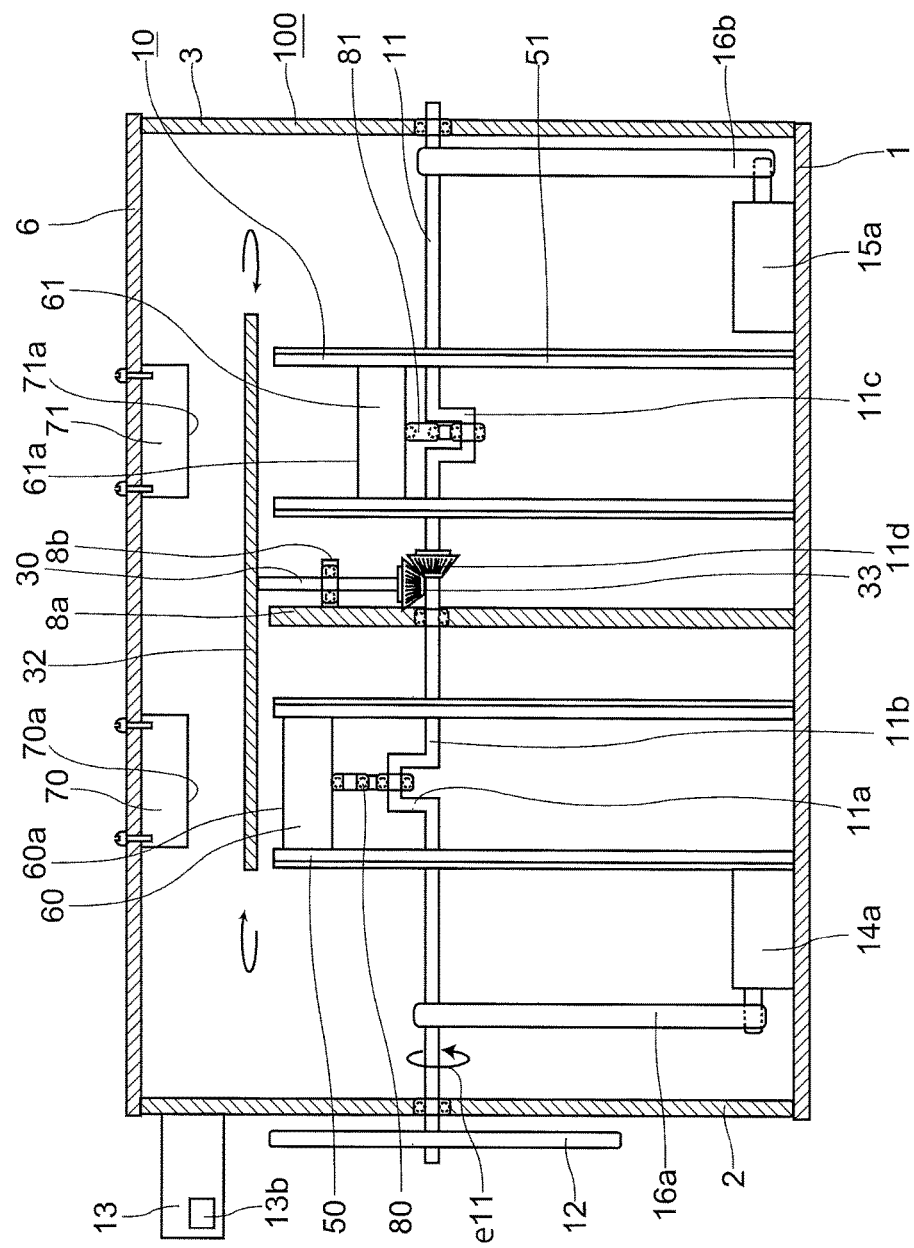
FIG. 2 is a sectional view of the rotary power generating apparatus taken along the line 2-2 in FIG. 1.
Figure 3:
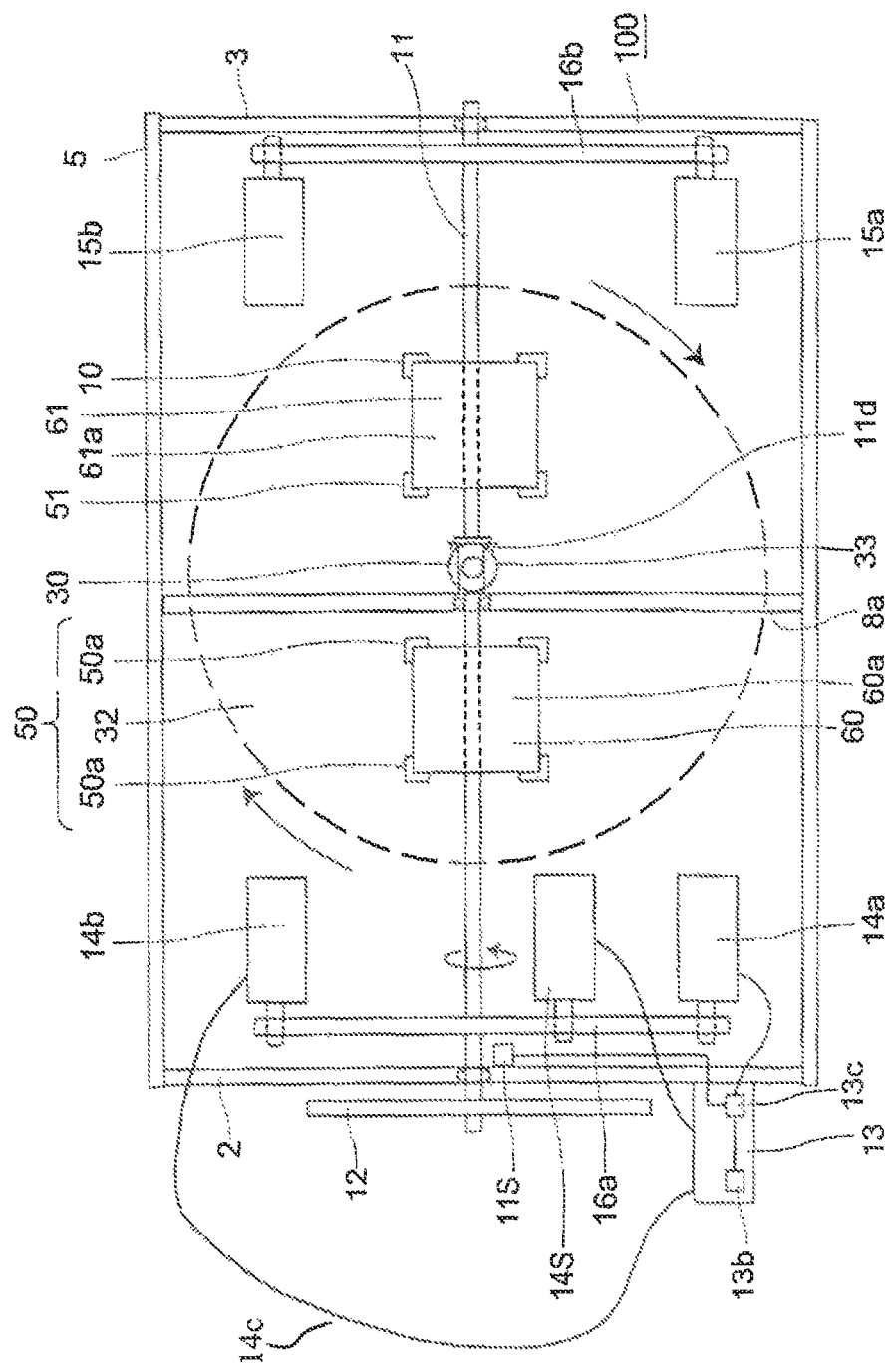
FIG. 3 is a plan view illustrating the rotary power generating apparatus which the lid part is removed.
Figure 4:
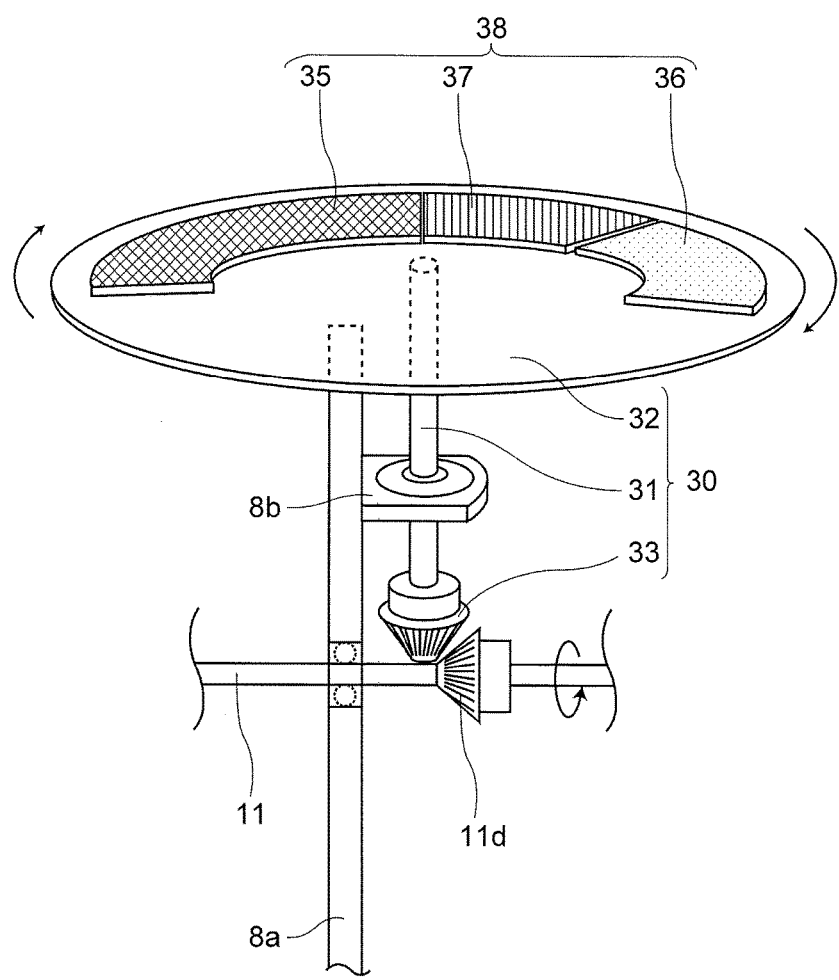
FIG. 4 is a perspective view illustrating a principal part of a demagnetizing member and crankshaft.
Figure 6:
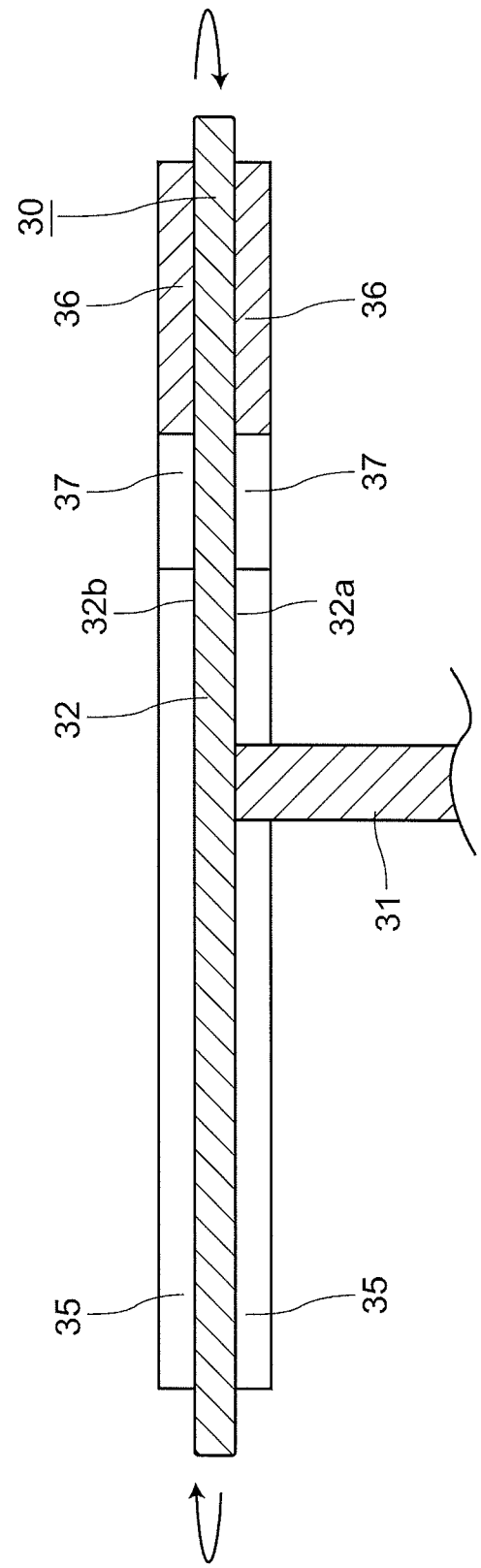
FIG. 6 is a sectional view of the demagnetizing member taken along the line 6-6 in FIG. 5 with a part of it omitted.
Figure 7:
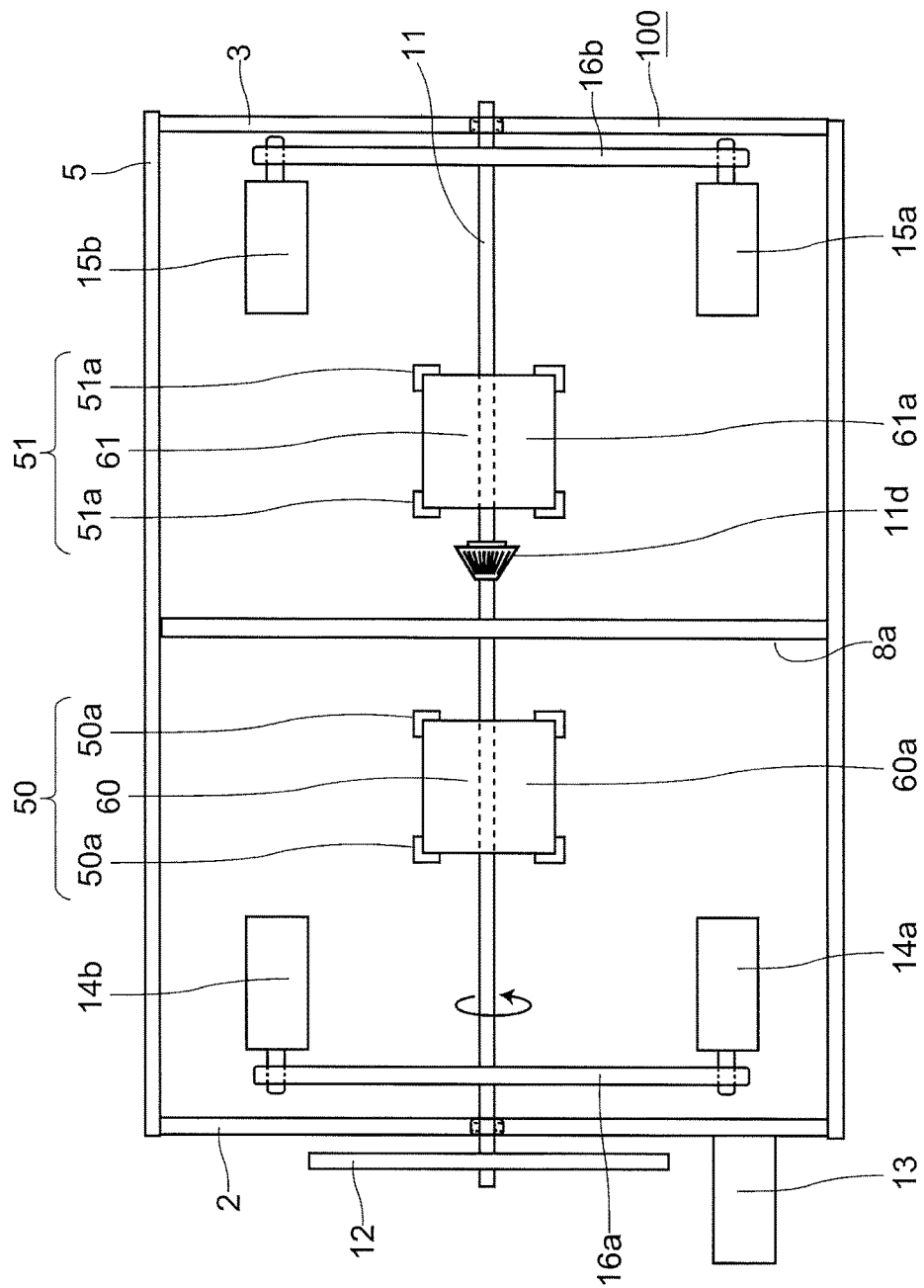
FIG. 7 is a plan view illustrating the rotary power generating apparatus which the lid part and demagnetizing member are removed.
Figure 8:
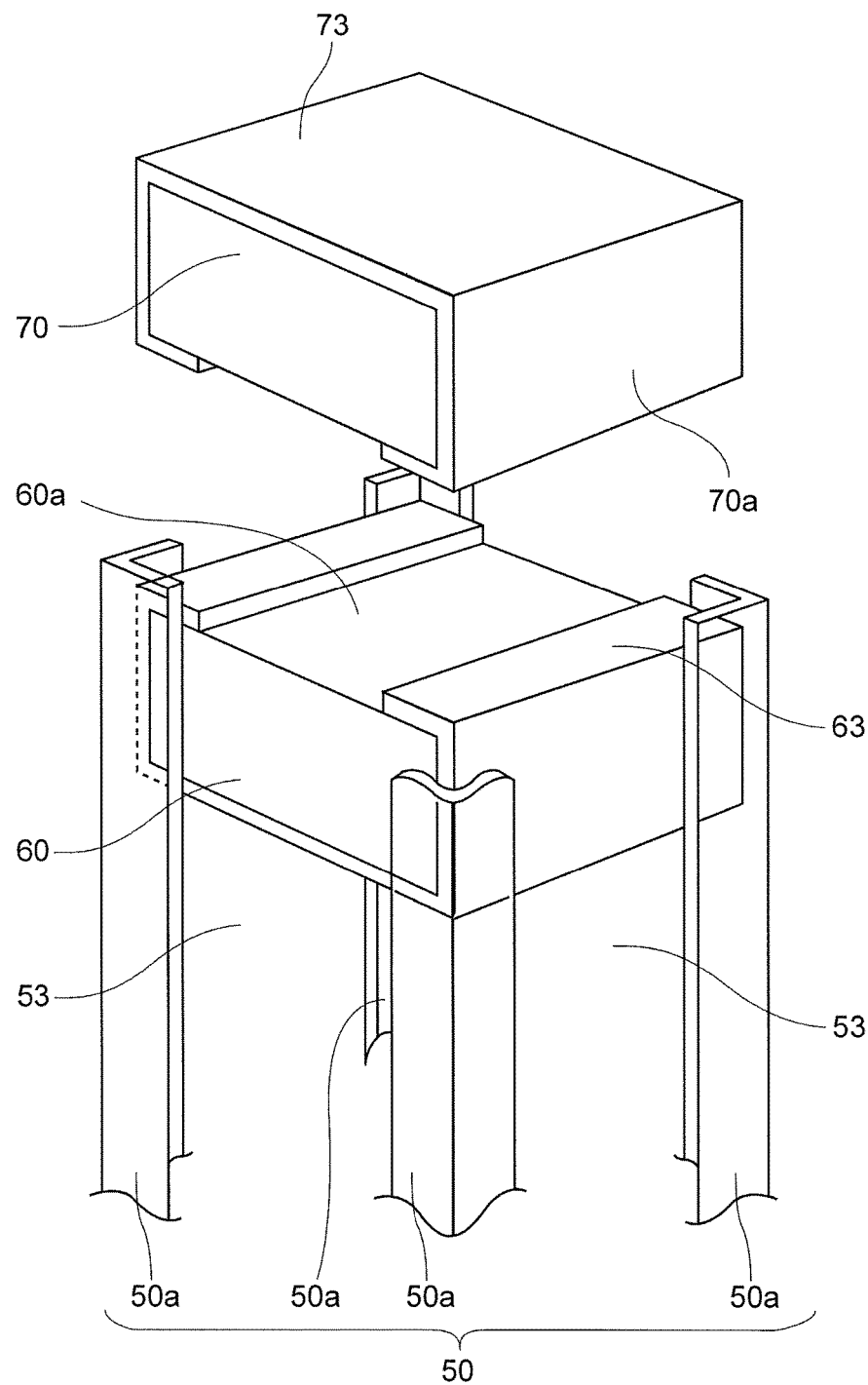
FIG. 8 is a perspective view illustrating a first guide member, a first piston magnet member and first fixed magnet member, with parts of them omitted.
Figure 9:
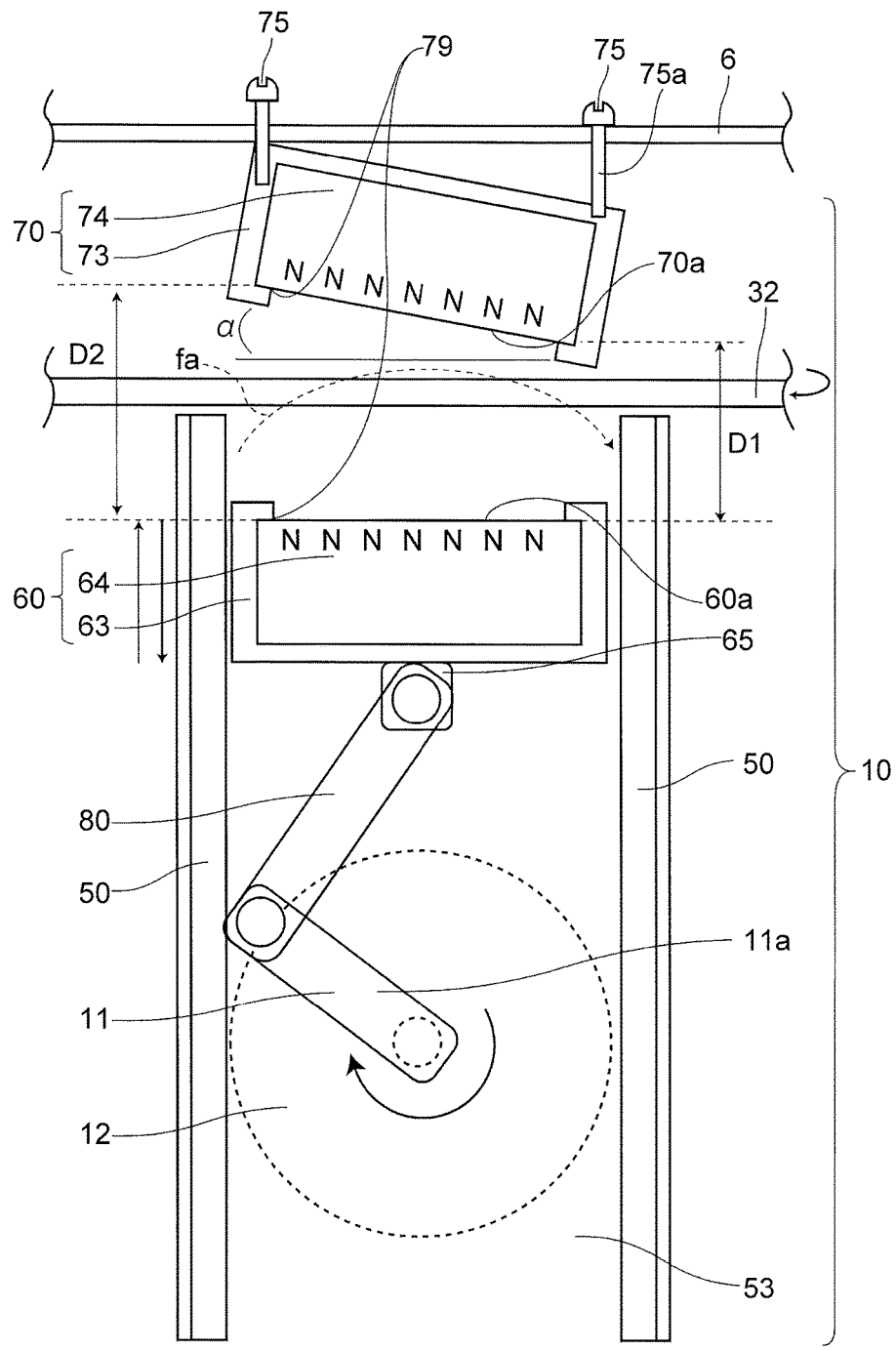
FIG. 9 is a side elevation view of an engine part, of the first piston magnet member side, seen from a direction intersecting the crankshaft.

Here, FIG. 1 is a perspective view illustrating the rotary power generating apparatus 100 according to the embodiment of the present invention, FIG. 2 is a sectional view of the rotary power generating apparatus 100 taken along the line 2-2 in FIG. 1 and FIG. 3 is a plan view illustrating the rotary power generating apparatus 100 which a lid part 6 is removed. Further, FIG. 4 is a perspective view illustrating a principal part of a demagnetizing member 30 and crankshaft 11, FIG. 5 (a) is a plan view illustrating the demagnetizing member 30, FIG. 5 (b) is a view illustrating a changing pattern of a demagnetizing magnet part 38 and non-magnetic force part 39 in the demagnetizing member 30. FIG. 6 is a sectional view of the demagnetizing member 30 taken along the line 6-6 in FIG. 5 with a part of it omitted. FIG. 7 is a plan view illustrating the rotary power generating apparatus 100 which the lid part 6 and the demagnetizing member 30 are removed. FIG. 8 is a perspective view illustrating a first guide member 50, a first piston magnet member 60 and first fixed magnet member 70, with parts of them omitted. FIG. 9 is a side elevation view of an engine part 10, of the first piston magnet member 60 side, seen from a direction intersecting the crankshaft 11.

The rotary power generating apparatus 100 has the first, second piston magnet members 60, 61, the first, second fixed magnet members 70, 71, which top pole surfaces 60a, 61a and fixed pole surfaces 70a, 71a, having magnetic poles with the same polarity, are arranged opposing each other, and has a demagnetizing rotating board 32, having magnetic poles with different polarity from the magnetic poles of the first, second piston magnet members 60, 61, which is arranged between the top pole surfaces 60a, 61a and the fixed pole surfaces 70a, 71a.

Then, in the rotary power generating apparatus 100, the first, second piston magnet members 60, 61 alternately approach to the first, second fixed magnet members 70, 71, while reducing the repulsive force of the first piston magnet member 60 and the first fixed magnet member 70 (hereinafter referred to as a "first repulsive force") and repulsive force of the second piston magnet member 61 and the second fixed magnet member 71 (hereinafter referred to as a "second repulsive force") using a demagnetizing rotating board 32 so that the first repulsive force and the second repulsive force have different strength.

Note that the approach, of the first, second piston magnet members 60, 61 to the first, second fixed magnet members 70, 71, is referred also as "progress", the getting away, of the first, second piston magnet members 60, 61 from the first, second fixed magnet members 70, 71, is referred also as "regress".

And, the second piston magnet members 61 is able to progress while reducing the second repulsive force during the first piston magnet member 60 regresses by the first repulsive force, after that, the first piston magnet member 60 is able to progress while reducing the first repulsive force during the second piston magnet member 61 regresses by the second repulsive force.

Because the first, second piston magnet members 60, 61 are able to repeat the above-described regress and progress alternately, in the rotary power generating apparatus 100, reciprocation of the first, second piston magnet members 60, 61 is able to be realized, and the continuity is able to be enhanced by using power of a later-described starter motor 14a.

And, the structure of the rotary power generating apparatus 100 will be explained as follows.

As illustrated in FIG. 1, FIG. 2, the rotary power generating apparatus 100 has a housing 7, having a bottom part 1, a left wall part 2, a right wall part 3, a front wall part 4, a back wall part 5 and the lid part 6. The engine part 10 is provided almost center of the housing 7. The crankshaft 11 of the engine part 10 passes through the left wall part 2, the right wall part 3 and a middle wall part 8a, and a flywheel 12 is fixed to the outside part of the crankshaft 11 than the left wall part 2. Further, a control panel 13 is fixed to outside part of the left wall part 2. The control panel 13 includes a monitor 13a, which displays an action condition of various measuring instrument, such as not-illustrated voltmeter, provided in the housing 7, a battery 13b and a not-illustrated heat vent.

Further, a rotation sensor 11S is provided in a neighborhood of the crankshaft 11 of the left wall part 2. The rotation sensor 11S is connected to a later-described timer relay 13c. The rotation sensor 11S detects the number of rotations of the crankshaft 11, and input the detected number of rotations to the timer relay 13c.

And the control panel 13 has at least the timer relay 13c as the above-described measuring instrument. The timer relay 13c is connected to the battery 13b, rotation sensor 11S and later-described starter motor 14a. An internal relay of the timer relay 13c operates regularly (for example, in every several seconds). Further, the internal relay also operates when the number of rotations of the crankshaft 11, input from the rotation sensor 11S, become smaller than the number of rotations which is set (set-up number of rotations). When the timer relay 13c operates, electric power is supplied to the later-described starter motor 14a from the battery 13b.

Further, the starter motor 14a, a DC generator (dynamo) 14b and motor generators 15a, 15b are fixed on the bottom part 1 in the housing 7. The starter motor 14a and DC generator (dynamo) 14b are connected to the crankshaft 11 with a belt 16a, motor generators 15a, 15b are connected to the crankshaft 11 with a belt 16b. The starter motor 14a is connected to the battery 13b. The DC generator (dynamo) 14b is also connected to the battery 13b (line 14c). The motor generators 15a, 15b are connected to the output code (not illustrated).

The starter motor 14a supplies rotary power to the crankshaft 11 via the belt 16a. The starter motor 14a corresponds to an auxiliary motor according to the present invention. It is preferable that an assist motor 14S is provided in addition to the starter motor 14a, as illustrated in FIG. 3. The assist motor 14S is connected to the battery 13b (not illustrated). Further, the assist motor 14S, similar with the starter motor 14a, supplies rotary power to the crankshaft 11 via the belt 16a.

The engine part 10 has the crankshaft 11, the first, second guide members 50, 51, the first, second piston magnet members 60, 61, the first, second fixed magnet members 70, 71, the first, second connecting rods 80, 81 and the demagnetizing member 30.

The crankshaft 11 has the first, second crank parts 11a, 11c, connecting part 11b, which connect the first crank part 11a with the second crank part 11c, and a bevel gear 11d fixed on the connecting part 11b. The first, second connecting rods 80, 81 are connected with the first, second crank parts 11a, 11c. Further, the crank angle of the first, second crank parts 11a, 11c is set up on 180 degrees.

The first guide member 50 has four holding members 50a, as illustrated in FIG. 3, FIG. 8 and so on. The holding member 50a, is an L-figure like member in sectional view, has a length that can guide the first piston magnet member 60 during all process of reciprocation. The respective holding member 50a is arranged outside the corner part of the respective first piston magnet member 60 so as to surround the first piston magnet member 60, and they are fixed on the bottom part 1. Each holding member 50a is distant from another holding member 50a to form gap parts 53 in the first guide member 50. Gap parts 53 are parts that connect inside of a rectangular parallel piped shaped space with outside, the space is surrounded with four holding members 50a. Gap parts 53 are formed in all range of reciprocation of the first, second piston magnet members 60, 61.

The second guide member 51 has the four holding members 51a similar with the holding members 50a. The respective holding member 51a is arranged outside the corner part of the respective second piston magnet member 61 so as to surround the second piston magnet member 61, and they are fixed on the bottom part 1. Gap parts, similar with the gap parts 53, are also formed in the second guide member 51.

The first, second piston magnet members 60, 61 have size of being accommodated inside the first, second guide members 50, 51 respectively, and they are formed so as to reciprocate inside the first, second guide members 50, 51. Further, the first, second piston magnet members 60, 61 are accommodated inside the first, second guide members 50, 51 so that the respective top pole surfaces 60a, 61a face the same direction (direction that they go toward the lid part 6, in this embodiment).

The first piston magnet member 60 (similar with the second piston magnet member 61, not illustrated in FIG. 8, FIG. 9) has a holding case 63 and a permanent magnet 64, as illustrated in FIG. 8, FIG. 9, in detail. The holding case 63 is a member, which aluminum board is bent so as to form approximately C-figure like shape in the cross section, and it has a size being accommodated inside the first guide member 50 (a space surrounded by the four holding members 50a). The permanent magnet 64 is a magnet having a size being fitted to the holding case 63 without gap, and it has an approximately rectangular parallel piped shape. The permanent magnet 64 is a magnet having an extremely strong magnetic force, for example neodymium magnet. The permanent magnet 64 is accommodated in the holding case 63 so that polarity of the surface of top dead center side (top pole surface 60a) is N-pole, in this embodiment. The permanent magnet 64 of the second piston magnet member 61 is also accommodated in the holding case 63 so that polarity of the surface of top dead center side (top pole surface 61a) is N-pole.

About both of the first, second piston magnet members 60, 61, connecting parts 65 are formed on the crankshaft 11 side of the holding cases 63. The first, second connecting rods 80, 81 are connected with the respective connecting parts 65 so as to turn practicably.

The first fixed magnet member 70 (similar with the second fixed magnet member 71, not illustrated in FIG. 8, FIG. 9) has a for-fixing holding case 73 and a permanent magnet 74, as illustrated in FIG. 8, FIG. 9, in detail. The for-fixing holding case 73 is a member having the same size and form with the holding case 63. The permanent magnet 74 is a magnet having a size being fitted to the for-fixing holding case 73 without gap, and it has an approximately rectangular parallel piped shape. The permanent magnet 74 is, for example, the same neodymium magnet with the permanent magnet 64. The permanent magnet 74 is accommodated in the for-fixing holding case 73 so that the surface (fixed pole surface 70a), having the same polarity (N-pole, in this embodiment) with polarity of the top pole surface 60a, oppose the top pole surface 60a. The permanent magnet 74 of the second fixed magnet member 71 is also accommodated in the for-fixing holding case 73 so that the fixed pole surface 71a is N-pole.

Both the permanent magnet 74 and permanent magnet 64 are magnets having extremely strong magnetic force, and because top pole surfaces 60a, 61a and fixed pole surfaces 70a, 71a, having same polarity, oppose each other, both the first repulsive force and second repulsive force are extremely strong.

Further, the first fixed magnet member 70 (similar with the second fixed magnet member 71, not illustrated in FIG. 9) is fixed to the lid part 6 with four adjusting members 75. Namely, screw parts 75a of the adjusting members 75 are inserted to the lid part 6 from outside, and they are screwed into the for-fixing holding case 73. When screw conditions of the screw parts 75a are changed, they bring change of slant of the first fixed magnet member 70 to the lid part 6, thereby slant of the fixed pole surface 70a changes.

Further, an interval D2, arranged hindmost position along a rotating direction fa of the crankshaft 11, is spread than an interval D1 of another part (the hindmost position is referred to as a "hindmost part" in this embodiment, and it is a part illustrated with numeral 79, in FIG. 9, the interval in the hindmost part 79 is also referred hindmost part interval), in the fixed pole surface 70a and top pole surfaces 60a (similar with the fixed pole surface 71a and top pole surface 61a).

Thereby the rotary power generating apparatus 100 has a repulsive force unequal structure, which the repulsive force between the top pole surface 60a and the fixed pole surface 70a at hindmost part 79 becomes weaker than the repulsive force in another part. Note that an angle between the fixed pole surface 70a and the top pole surface 60a is set predetermined inclined angle α.

The first, second connecting rods 80, 81 are connected with the bottom dead center sides (connecting parts 65) of the above-described first, second piston magnet members 60, 61. Both of the first, second connecting rods 80, 81 are connected with the crankshaft 11. The first, second connecting rods 80, 81 are respectively connected with the first, second crank parts 11a, 11c of the crankshaft 11.

Next, the demagnetizing member 30 will be explained. The demagnetizing member 30 is formed with non-magnetic material such as aluminum or the like. The demagnetizing member 30 has a rotating shaft 31, the demagnetizing rotating board 32 and a bevel gear 33, as illustrated in FIG. 4, FIG. 5(a), FIG. 6. The demagnetizing rotating board 32 is fixed to the top end part of the rotating shaft 31, and the bevel gear 33 is fixed to the bottom end part of the rotating shaft 31. The rotating shaft 31 is inserted into a supporting part 8b, via bearing, fixed to the middle wall part 8a. Note that the line 6-6 in FIG. 5 is supposed to be a center line through the center of the demagnetizing rotating board 32.

The demagnetizing rotating board 32 is a circular board having a thickness being accommodated in a space between the top pole surfaces 60a, 61a and fixed pole surfaces 70a, 71a, and it has a diameter capable of covering the top pole surfaces 60a, 61a, thereby it opposes all of the top pole surfaces 60a, 61a. The demagnetizing rotating board 32 has demagnetizing magnet parts 38 and non-magnetic force parts 39 on both of the lower surface 32a, opposing the top pole surfaces 60a, 61a, and the upper surface 32b, opposing the fixed pole surfaces 70a, 71a.

The demagnetizing magnet parts 38 and non-magnetic force parts 39 are formed in circular band-shape which the rotating shaft 31 is a center (referred to as toroidal). The demagnetizing magnet parts 38 are assigned in an area having a slightly larger size than half-circular part of the circular band-shaped part, the non-magnetic force parts 39 are assigned in the remaining area having a slightly smaller size than half-circular part. Thereby, the demagnetizing rotating board 32 is formed so that the non-magnetic force parts 39 oppose only one of the first, second piston magnet members 60, 61 and they do not oppose both of the first, second piston magnet members 60, 61 in the same instant.

Further, the demagnetizing rotating board 32 is formed so that demagnetizing magnet parts 38 and non-magnetic force parts 39 are arranged in positions corresponding to the top pole surfaces 60a, 61a of the demagnetizing rotating board 32, and the width w38, along the semidiameter direction, is almost the same size with the lateral width of the top pole surfaces 60a, 61a or is slightly larger size than the lateral width.

Furthermore, the demagnetizing magnet parts 38 have magnetic forces which are weaker than magnetic poles of the top pole surfaces 60a, 61a sides of the first, second piston magnet members 60, 61, and different from polarity of the top pole surfaces 60a, 61a. In this embodiment, the polarity of the demagnetizing magnet parts 38 is set S-pole. The demagnetizing magnet parts 38 have magnetic forces weaker than the permanent magnets 64, 74.

The demagnetizing magnet parts 38 have strong demagnetizing parts 35 having the strongest magnetic force, weak demagnetizing parts 36 having the weakest magnetic force and middle demagnetizing parts 37 having middle magnetic force of the strong demagnetizing parts 35 and the weak demagnetizing parts 36. The strong demagnetizing parts 35, the middle demagnetizing parts 37 and the weak demagnetizing parts 36 are arranged sequentially along the clockwise peripheral direction, in the demagnetizing magnet parts 38.

Therefore, when the demagnetizing rotating board 32 rotates clockwise, as illustrated in FIG. 5 (b), because the weak demagnetizing parts 36, the middle demagnetizing parts 37 and the strong demagnetizing parts 35 appear sequentially on the top pole surfaces 60a, 61a, the magnetic force of the demagnetizing magnet parts 38 changes to become strong gradually along the peripheral direction. The demagnetizing magnet parts 38 have a magnetic force changing structure which the magnetic force changes in this manner. Further, the non-magnetic force parts 39 appear following the demagnetizing magnet parts 38, the weak demagnetizing parts 36 appear afterward.

Further, the non-magnetic force parts 39 are parts of the circular band-shape part of the demagnetizing rotating board 32 along the peripheral direction, and they correspond to the parts between the strong demagnetizing parts 35 and the weak demagnetizing parts 36. The non-magnetic force parts 39 are the parts which do not have magnetic force.

The bevel gear 11d is engaged with the bevel gear 33. Therefore, the rotating shaft 31 rotates in accordance with the rotation of the crankshaft 11, thereby the demagnetizing rotating board 32 rotates. The bevel gear 33 and the bevel gear 11d are formed so that when the demagnetizing rotating board 32 rotates in the rotating shaft 31 by one time, the crankshaft 11 rotates one time, thereby the first, second piston magnet members 60, 61 reciprocate inside the first, second guide members 50, 51 (this will be explained later in detail).

Furthermore, the bevel gear 33 is engaged with the bevel gear 11d so that the rotary power generating apparatus 100 has the following structure. Therefore, the respective position of the bevel gear 33 and the bevel gear 11d are adjusted when the bevel gear 33 is engaged with the bevel gear 11d, in the rotary power generating apparatus 100. The structure is a structure which the second piston magnet member 61 reaches the bottom dead center at the moment when the first piston magnet member 60 reaches the top dead center, immediately after that, at a first gap, the demagnetizing magnet parts 38 of the demagnetizing rotating board 32 changes to the non-magnetic force part 39, and the weak demagnetizing magnet parts 36 are arranged in a second gap (hereinafter this structure is also referred to as a "basic structure").

Note that the first gap is a part between the first piston magnet member 60 and the first fixed magnet member 70, and the second gap is a part between the second piston magnet member 61 and the second fixed magnet member 71.

(Action Contents of the Rotary Power Generating Apparatus)

Next, action contents of the rotary power generating apparatus 100 will be explained with reference to FIG. 10 to FIG. 20.

Figure 10:
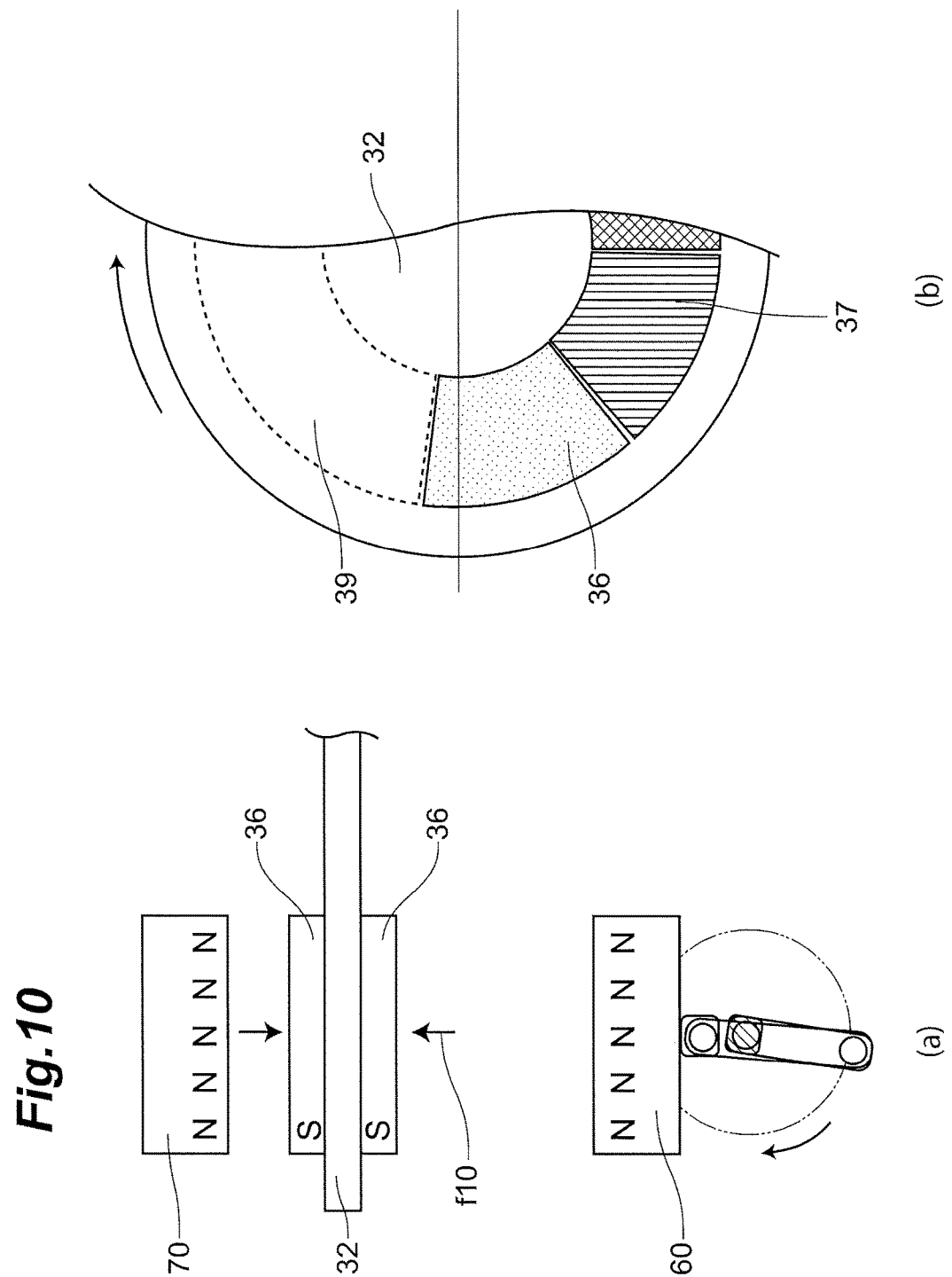
FIG. 10 (a) is a view schematically illustrating the first piston magnet member, the first fixed magnet member and a demagnetizing rotating board, immediately after the first piston magnet member reached the bottom dead center, FIG. 10 (b) is a view schematically illustrating the principal part of the demagnetizing rotating board at that time.

Here, FIG. 10 (a) is a view schematically illustrating the first piston magnet member 60, the first fixed magnet member 70 and the demagnetizing rotating board 32, immediately after the first piston magnet member 60 reached the bottom dead center, FIG. 10 (b) is a view schematically illustrating a principal part of the demagnetizing rotating board 32 at that time. FIG. 11 (a) to FIG. 13 (a) are views schematically illustrating the first piston magnet member 60, the first fixed magnet member 70 and the demagnetizing rotating board 32 respectively subsequent to those in FIG. 10 (a) to FIG. 12 (a), FIG. 11 (b) to FIG. 13 (b) are views schematically illustrating principal parts of the demagnetizing rotating board 32 subsequent to that in FIG. 10 (b) to FIG. 12 (b).

Figure 13:
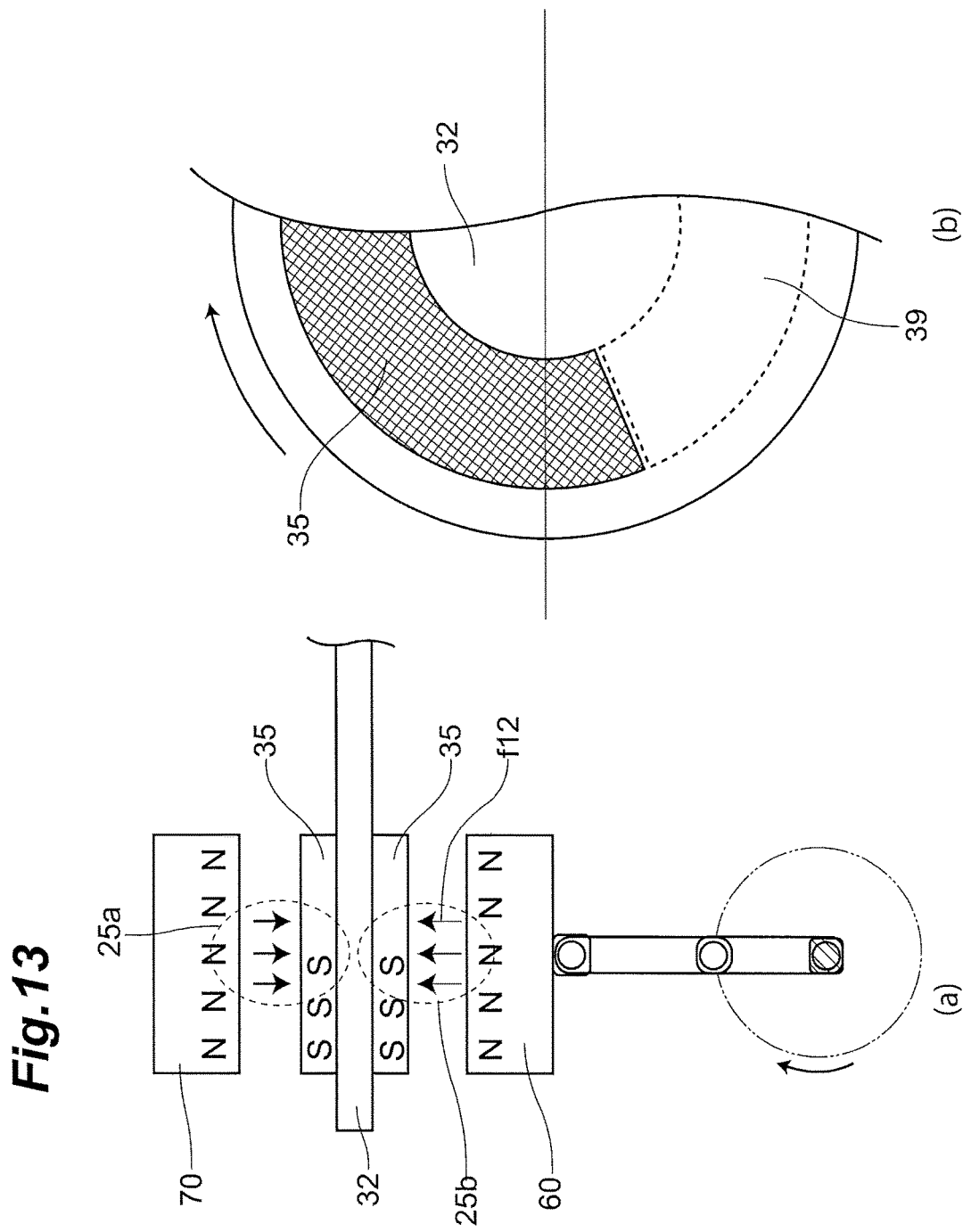
FIG. 13 (a) is a view schematically illustrating the first piston magnet member, the first fixed magnet member and the demagnetizing rotating board subsequent to those in FIG. 12 (a), FIG. 13 (b) is a view schematically illustrating the principal part of the demagnetizing rotating board subsequent to that in FIG. 12 (b)
Figure 14:
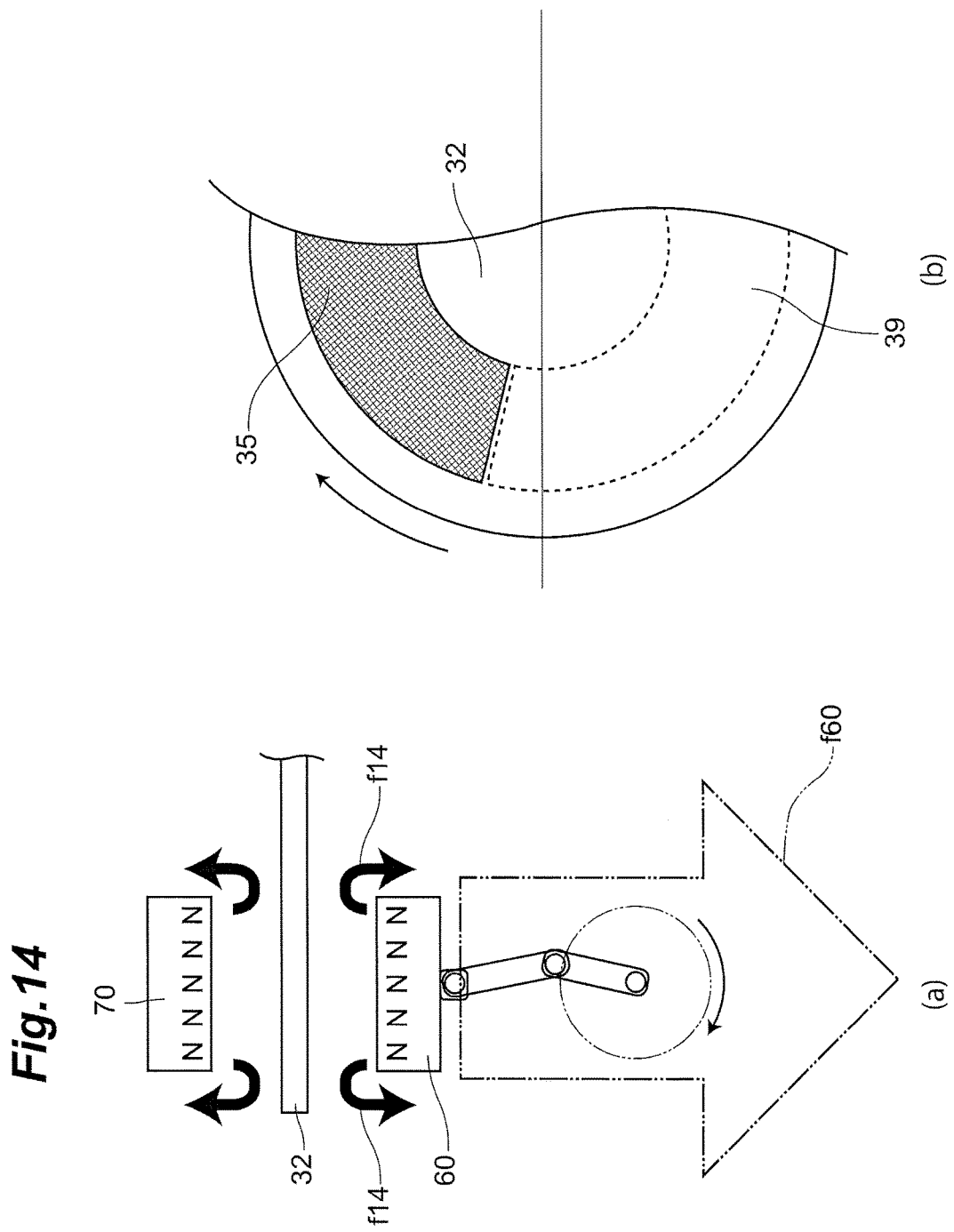
FIG. 14 (a) is a view schematically illustrating the first piston magnet member, the first fixed magnet member and the demagnetizing rotating board subsequent to those in FIG. 13 (a), FIG. 14 (b) is a view schematically illustrating the principal part of the demagnetizing rotating board subsequent to that in FIG. 13 (b)
Figure 15:
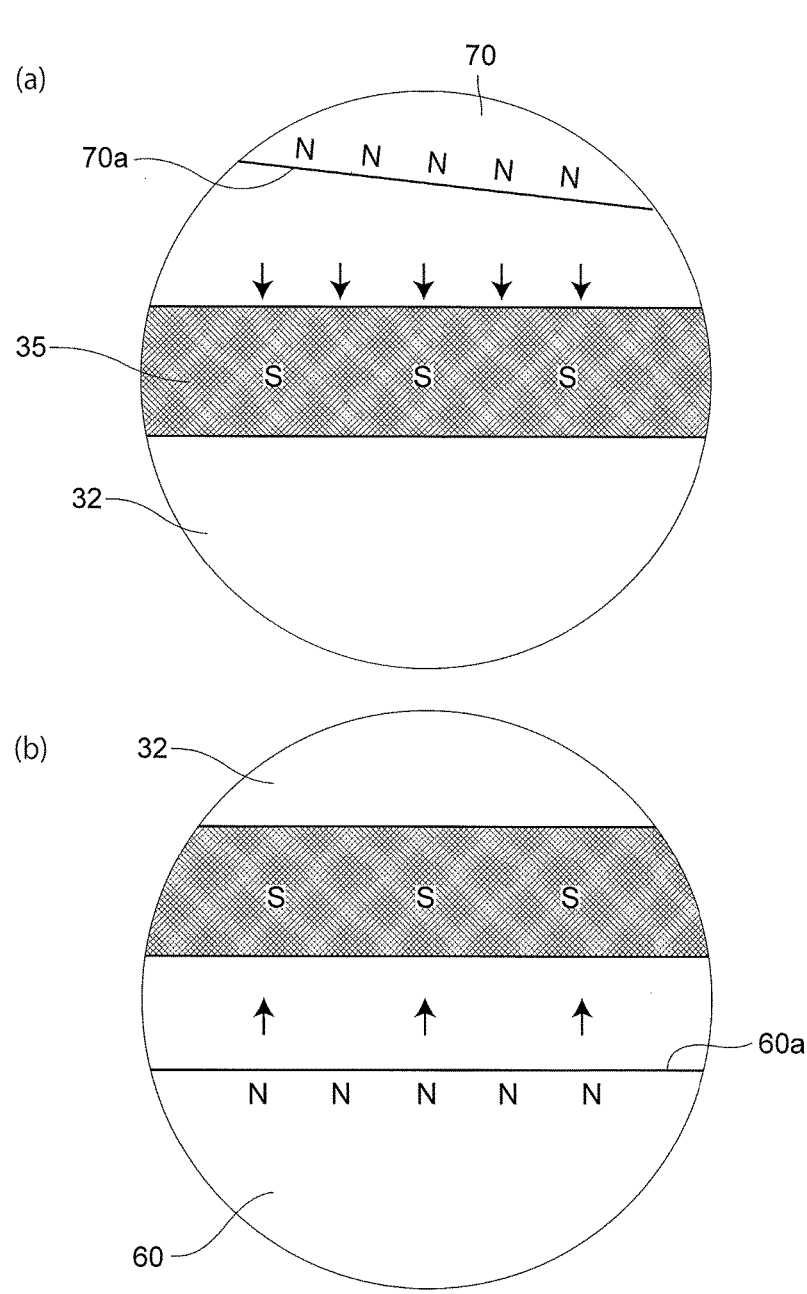
FIG. 15 (a) is an enlarged view of a part 25a enclosed with dot line in FIG. 13 (a), FIG. 15 (b) is an enlarged view of a part 25b enclosed with dot line in FIG. 13 (a)

FIG. 14 (a) is a view schematically illustrating the first piston magnet member 60, the first fixed magnet member 70 and the demagnetizing rotating board 32 subsequent to those in FIG. 13 (a), FIG. 14 (b) is a view schematically illustrating the principal part of the demagnetizing rotating board 32 at that time. FIG. 15 (a) is an enlarged view of a part 25a enclosed with dot line in FIG. 13 (a), FIG. 15 (b) is an enlarged view of a part 25b enclosed with dot line in FIG. 13 (a).

Because the rotary power generating apparatus 100 has the above-described structure, it operates as follows. For operating the rotary power generating apparatus 100, first of all, not-illustrated power switch is turned on to operate the starter motor 14a. When the starter motor 14a operates using electric power stored in the battery 13b, power from the starter motor 14a is transmitted to the crankshaft 11 via the belt 16a, thereby the crankshaft 11 rotates along a direction indicated by the arrow e11 in FIG. 2. With this motion, the first, second piston magnet members 60, 61 move inside the first, second guide members 50, 51 via the first, second connecting rods 80, 81. Initial action is completed in this manner.

Note that because a not-illustrated overrunning clutch is provided with the starter motor 14a, power from the crankshaft 11 is not transmitted to the starter motor 14a. The rotary power generating apparatus 100 utilizes power from the starter motor 14a in the above-described initial action, and it also utilizes power from the starter motor 14a regularly (for example, in every several seconds) after the initial action is completed. Further, the rotary power generating apparatus 100 also utilizes power from the starter motor 14a when the number of rotations of the crankshaft 11 become smaller than the set-up number of rotations. In these cases, the timer relay 13c operates, thereby the starter motor 14a operates with supplied power from the battery 13b, and power from the starter motor 14a is transmitted to the crankshaft 11. Actions of the rotary power generating apparatus 100 are, after the initial action is completed, as follows.

Here, as illustrated in FIG. 10 (a), a condition, immediately after the first piston magnet member 60 reaches the bottom dead center, is supposed. At this time, because the crankshaft 11 tries to continue the former rotation because of its inertia, the first piston magnet member 60 tries to approach the first fixed magnet member 70.

At this time, the demagnetizing magnet parts 38 of the demagnetizing rotating board 32 appears in the first gap, at the timing that the first piston magnet member 60 reach the bottom dead center. Further, as illustrated in FIG. 10 (b), the weak demagnetizing parts 36 are still arranged in the first gap, immediately after the first piston magnet member 60 reach the bottom dead center. Because, the polarity of the weak demagnetizing parts 36 are different from the polarities of the top pole surface 60a, the fixed pole surfaces 70a, the weak demagnetizing parts 36 display demagnetizing operation to weaken the magnetic forces emitted from the top pole surface 60a, the fixed pole surface 70a. A first repulsive force, which always operates between the first piston magnet member 60 and the first fixed magnet member 70, is reduced only with an attractive force f10, because of the demagnetizing operation. Thereby, the first piston magnet member 60 becomes easy to progress.

Next, as illustrated in FIG. 11 (a), the first piston magnet member 60 progress, and in company with this action, as illustrated in FIG. 11 (b), the weak demagnetizing parts 36 of the demagnetizing rotating board 32 change to the middle demagnetizing parts 37, the middle demagnetizing parts 37 appear in the first gap. The first repulsive force increases in accordance with the progress of the first piston magnet member 60 though, the first repulsive force is reduced only with an attractive force f11, larger than the attractive force f10, in company with the switch from the weak demagnetizing parts 36 to the middle demagnetizing parts 37. Therefore the first piston magnet member 60 progresses continuously.

Subsequently, as illustrated in FIG. 12 (a), the first piston magnet member 60 progress, and in company with this action, as illustrated in FIG. 12 (b), the middle demagnetizing parts 37 of the demagnetizing rotating board 32 change to the strong demagnetizing parts 35, the strong demagnetizing parts 35 appear in the first gap. Therefore, the first repulsive force is reduced only with an attractive force f12, larger than the attractive force f11, the first piston magnet member 60 progresses continuously.

Furthermore, the first piston magnet member 60 progresses. At this time, because the strong demagnetizing parts 35 are arranged in the first gap, the first repulsive force is reduced only with the attractive force f12. When the first piston magnet member 60 progresses continuously, after that, as illustrated in FIG. 13 (a), the first piston magnet member 60 reaches the top dead center. At this time, as illustrated in FIG. 13 (b), the strong demagnetizing parts 35 are still arranged in the first gap.

Then, as illustrated in FIG. 14 (a), immediately after the first piston magnet member 60 reach the top dead center, the strong demagnetizing parts 35 of the demagnetizing rotating board 32 change to the non-magnetic force parts 39 in the first gap, and the non-magnetic force parts 39 are arranged in the first gap instead of the strong demagnetizing parts 35.

Whereupon, the first repulsive force is reduced due to the demagnetizing operations of the strong demagnetizing parts 35 until that time, reducing operation concerning the first repulsive force disappears suddenly, due to the switching from the strong demagnetizing parts 35 to the non-magnetic force parts 39. Therefore, as illustrated in FIG. 14 (a), a mighty first repulsive force f14 revives suddenly between the first piston magnet member 60 and the first fixed magnet member 70. The first piston magnet member 60 is push down strongly due to the first repulsive force f14, immediately after the reaching to the top dead center, and it regresses vigorously along to the direction illustrated f60.

Note that because the first connecting rod 80 extends straight when the first piston magnet member 60 reaches the top dead center, the first piston magnet member 60 is hard to regress even if the first repulsive force operates. It is preferable that the strong demagnetizing parts 35 change to the non-magnetic force parts 39 immediately after the first piston magnet member 60 reach the top dead center, for easy regress of the first piston magnet member 60.

The action, from immediately after the first piston magnet member 60 reaches the bottom dead center to immediately after the first piston magnet member 60 reaches the top dead center (referred to as an action of half-process) is explained in the above. The action of half-process concerning the first piston magnet member 60 is parallel with the regressive action of half-process of the second piston magnet member 61.

The first piston magnet member 60, the first fixed magnet member 70, and the second piston magnet member 61, the second fixed magnet member 71 perform the action of half-process alternately, in the rotary power generating apparatus 100. Subsequently, the action will be explained with reference to FIG. 16 to FIG. 20.

Figure 16:
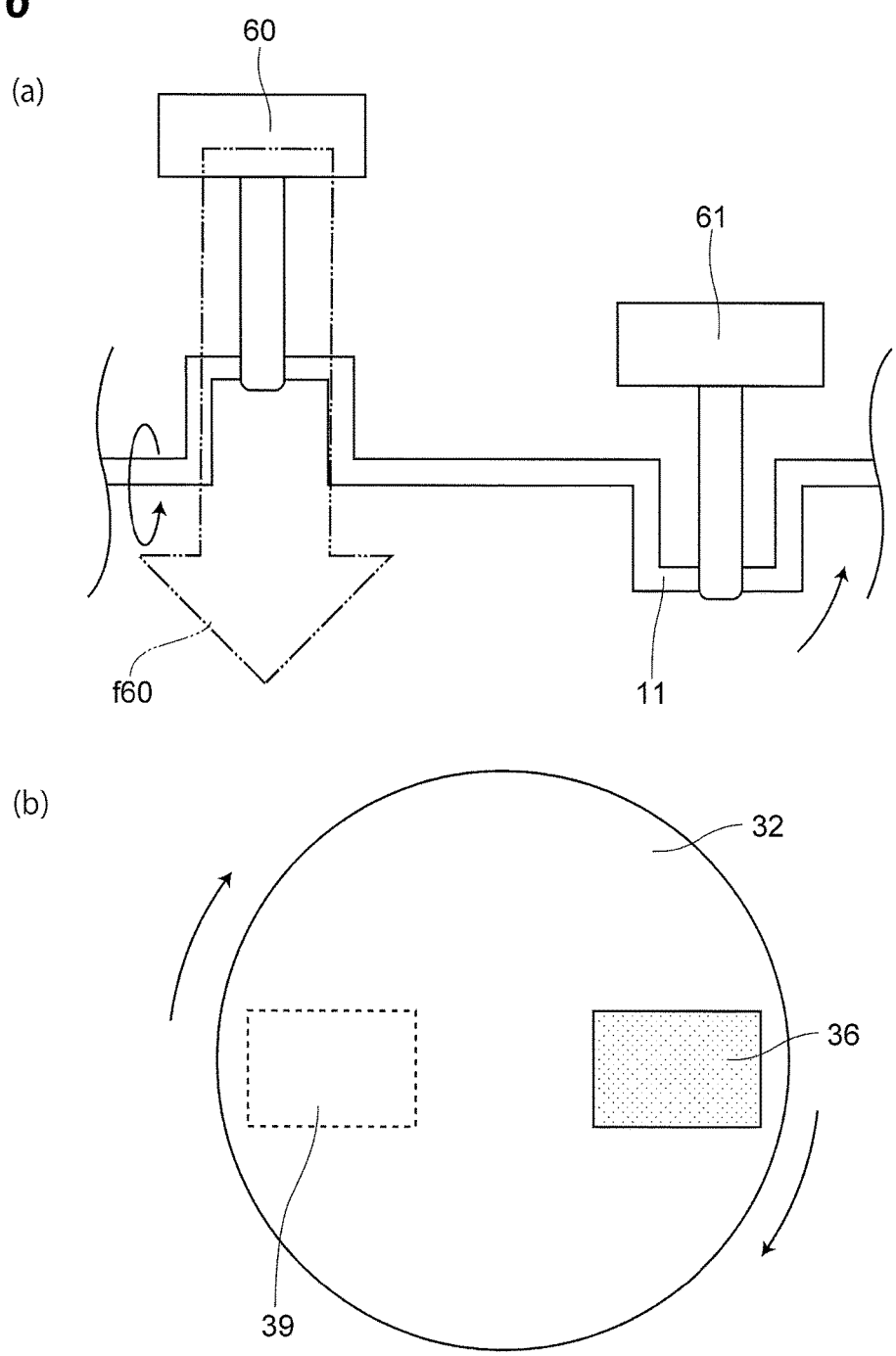
FIG. 16 (a) is a view schematically illustrating the first, second piston magnet members and the crankshaft, immediately after the first, second piston magnet members reached the top dead center, bottom dead center respectively, FIG. 16 (b) is a view schematically illustrating the demagnetizing rotating board at that time.
Figure 17:
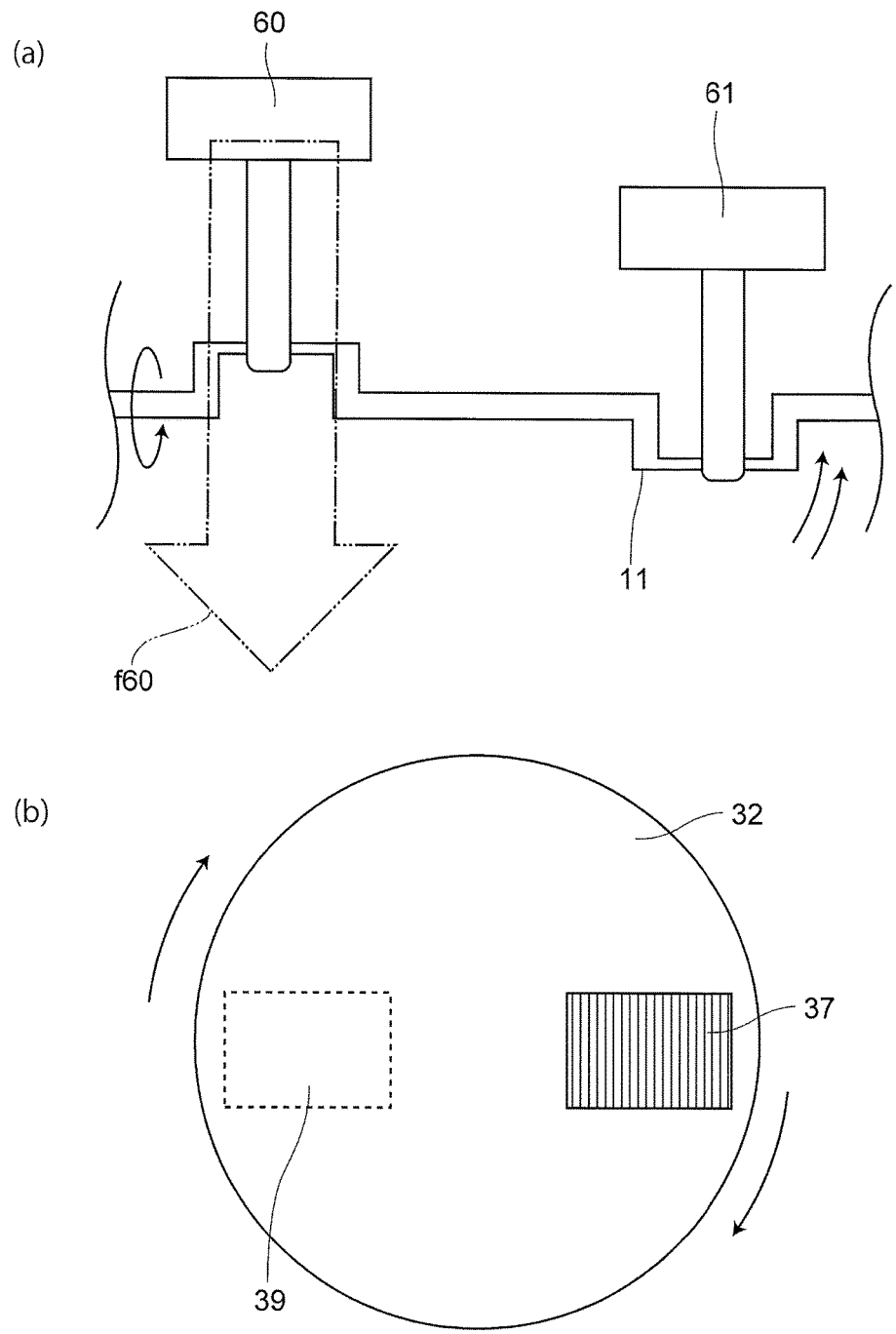
FIG. 17 (a) is a view schematically illustrating the first, second piston magnet members and the crankshaft subsequent to those in FIG. 16 (a), FIG. 17 (b) is a view schematically illustrating the demagnetizing rotating board subsequent to that in FIG. 16 (b)

Here, FIG. 16 (a) is a view schematically illustrating the first, second piston magnet members 60, 61 and the crankshaft 11, immediately after the first, second piston magnet members 60, 61 reached the top dead center, bottom dead center respectively, FIG. 16 (b) is a view schematically illustrating the demagnetizing rotating board 32 at that time. FIG. 17 (a) to FIG. 20 (a) are views schematically illustrating the first, second piston magnet members 60, 61 and the crankshaft 11 respectively subsequent to those in FIG. 16 (a) to FIG. 19 (a), FIG. 17 (b) to FIG. 20 (b) are views schematically illustrating the demagnetizing rotating board 32 respectively subsequent to that in FIG. 16 (b) to FIG. 19 (b).

Here, as illustrated in FIG. 16 (a), a condition, immediately after the first, second piston magnet members 60, 61 reach respectively the top dead center, the bottom dead center, is supposed. In this case, the bevel gear 33 is engaged with the bevel gear 11d so that the rotary power generating apparatus 100 has the above-described basic structure. Therefore, demagnetizing magnet parts 38 (strong demagnetizing parts 35) of the demagnetizing rotating board 32 change to the non-magnetic force parts 39 in the first gap, and the weak demagnetizing parts 36 are arranged in the second gap. Accordingly, the first piston magnet member 60 regresses vigorously along the direction illustrated f60, and the second piston magnet member 61 progresses due to the reducing of the second repulsive force.

Subsequently, as illustrated in FIG. 17 (a), the second piston magnet member 61 progresses due to the reducing of the second repulsive force coincidentally with the vigor regress of the first piston magnet member 60. When the action continues, as illustrated in FIG. 18 (a), the first, second crank parts 11a, 11c of the crankshaft 11 become parallel.

At this time, as illustrated in FIG. 18 (b), the non-magnetic force parts 39 are arranged in the first gap, and the strong demagnetizing parts 35 are arranged in the second gap coincidentally. Therefore, the crankshaft 11 rotates continuously so that the second piston magnet member 61 progresses while the first piston magnet member 60 regress. Further, because the demagnetizing rotating board 32 keeps the same condition, as illustrated in FIG. 19 (a), this condition also continues after that.

Whereupon, next time, as illustrated in FIG. 20 (a), the first piston magnet member 60 reaches the bottom dead center and the second piston magnet member 61 reaches the top dead center. Therefore, the first, second piston magnet members 60, 61 exchange the executed action of half-process and continue the action.

As mentioned above, the first, second piston magnet members 60, 61 continue the action of half-process repeatedly and alternately. Therefore, reciprocations of the first, second piston magnet members 60, 61 are able to be realized, and the reciprocations are performed continuously with power of the starter motor 14a, and the continuity of the reciprocation is able to be enhanced, in the rotary power generating apparatus 100. The number of rotations of the crankshaft 11 reduces due to influence of frictional force and so on that was caused by motions of each member such as the crankshaft 11, the first, second piston magnet members 60, 61 or the like. Whereupon, the reciprocation of the first, second piston magnet members 60, 61 are difficult to continue. Therefore, power of the starter motor 14a is utilized in the rotary power generating apparatus 100, as mentioned above.

Further, if the assist motor 14S is provided, continuity of reciprocation of the first, second piston magnet members 60, 61 is able to be enhanced with power of the assist motor 14S. In this case, because the electric power from the battery 13b is supplied to the assist motor 14S, the electric power stored in the battery 13b is consumed. Thereby, extra charge of the battery 13b is prevented.

Continuity of the reciprocation of the first, second piston magnet members 60, 61 brings continuity of the rotary motion of the crankshaft 11 via the first, second connecting rods 80, 81. Whereupon, rotary power of the crankshaft 11 is transmitted to the motor generators 15a, 15b via belt 16b, coils of the motor generators 15a, 15b rotate. Electric power is obtained with the rotation of coils of the motor generators 15a, 15b. This electric power is able to be taken outside with not-illustrated out-put code.

(Operation and Effect of the Rotary Power Generating Apparatus)

As mentioned above, the polarity of magnetic pole of the top pole surfaces 60a, 61a equal to the polarity of magnetic pole of the fixed pole surfaces 70a, 71a, in the first, second piston magnet members 60, 61 and the first, second, fixed magnet members 70, 71. Therefore, the first, second repulsive forces, which try to regress the first, second piston magnet members 60, 61 respectively, always operate to the first, second piston magnet members 60, 61 and the first, second fixed magnet members 70, 71.

However, the demagnetizing rotating board 32 is arranged in both of the first gap and the second gap. Demagnetizing magnet parts 38 are formed on the demagnetizing rotating board 32, and polarity of the magnetic power in the demagnetizing magnet parts 38 is different from the polarity of magnetic poles in the top pole surfaces 60a, 61a, the fixed pole surfaces 70a, 71a.

Therefore, lines of magnetic forces, transmitted from the first, second piston magnet members 60, 61 and the first, second, fixed magnet members 70, 71, are partially absorbed in the demagnetizing magnet parts 38. Whereupon, because lines of magnetic forces, contribute to repulsing between the top pole surfaces 60a, 61a and the fixed pole surfaces 70a, 71a are reduced, magnetic forces, which bring the first, second repulsive forces, are reduced. Because the demagnetizing magnet parts 38 exhibit the above-mentioned demagnetizing operation, which reduce the magnetic force, the first, second repulsive forces are reduced due to the appearances of the demagnetizing magnet parts 38 in the first, second gaps.

Further, the demagnetizing rotating board 32 is formed so that the demagnetizing magnet parts 38 and the non-magnetic force parts 39 are arranged adjacently, and the non-magnetic force parts 39 are arranged in only one of the first, second gaps, in the rotary power generating apparatus 100. When the demagnetizing rotating board 32 rotates, the non-magnetic force parts 39 are arranged in only one of the first, second gaps, and they are never arranged in both of the first, second gaps at the same time.

Therefore, the first, second repulsive force, without being reduced, never operate to the first, second piston magnet members 60, 61 at the same time. If the first, second repulsive force, without being reduced, operate to the first, second piston magnet members 60, 61 at the same time, both of the first, second piston magnet members 60, 61 try to regress, thereby there is the possibility which the reciprocation is not able to be obtained. However, the rotary power generating apparatus 100 does not have the above possibility.

Because demagnetizing operation, by the demagnetizing magnet parts 38, operates at least one of the first, second repulsive forces, the second piston magnet member 61 progress easily when the first piston magnet member 60 regress, and inversely, the first piston magnet member 60 progress easily when the second piston magnet member 61 regress. The first, second repulsive forces always operate to the first, second piston magnet members 60, 61 respectively, however, the first, second repulsive forces, having same strength, never operate to the first, second piston magnet members 60, 61 at the same time. Therefore, the first, second piston magnet members 60, 61 are able to be regressed alternately. Further, one of the first, second piston magnet members 60, 61 regresses, after that the other regresses smoothly because of the inertia of the crankshaft 11. Therefore, the first, second piston magnet members 60, 61 regress continuously.

By the way, as the power transmitting machinery disclosed in the patent document 3, two magnets having different polarity approach to two piston magnets alternately, thereby the repulsive force and attractive force become to operate alternately, in the conventional technology.

However, if once the piston magnets are kept away by the repulsive force, it is impossible that the piston magnets return to the original position with the attractive force, even if extremely powerful magnet is utilized. Namely, reciprocation of the piston magnet is not able to be obtained by operating the repulsive force and attractive force to the piston magnet alternately.

On this point, only repulsive force operates to the first, second piston magnet members 60, 61, however the reciprocation is not able to be obtained by operating the repulsive force having same strength to them, so the rotary power generating apparatus 100 has the above-mentioned structure in consideration of the above.

Namely, while one of the first, second piston magnet members 60, 61 regress, progress of the other is supported due to the reducing the repulsive force, thereby the reciprocations of the piston magnets are realized, further the reducing the repulsive force is performed alternately, furthermore power of the starter motor 14a is utilized, thereby they make the reciprocation of the piston magnet members sustainable, in the rotary power generating apparatus 100. Note that there is the possibility of the reducing operation to both of the first, second repulsive forces, according to the formation of the demagnetizing magnet parts 38. In that case, it is sufficient that magnetic forces of the demagnetizing magnet parts 38, arranged in the respective first, second gaps, are different each other (for example, one is strong demagnetizing part, the other is weak demagnetizing part, and so on).

The demagnetizing rotating board 32 is effective in reducing the repulsive force alternately. The demagnetizing rotating board 32 has a size covering the top pole surfaces 60a, 61a both of the first, second piston magnet members 60, 61, and it has the demagnetizing magnet parts 38 and the non-magnetic force parts 39.

Therefore, reducing the repulsive force to the first, second piston magnet members 60, 61 are able to be performed alternately due to the rotation of the demagnetizing rotating board 32. Accordingly, in the rotary power generating apparatus 100, reciprocations of the first, second piston magnet members 60, 61 are able to be obtained, and utilizing the power of the starter motor 14a makes the reciprocation sustainable, and the continuity is able to be enhanced.

Thereby, continuous rotary power, which the crankshaft 11 rotates continuously, is able to be obtained.

Further, because magnetic forces of the demagnetizing magnet parts 38 are weaker than magnetic forces of magnetic poles of the first, second piston magnet members 60, 61, the first, second repulsive forces are able to be kept, even if the lines of magnetic forces are absorbed by the demagnetizing magnet parts 38.

Furthermore, because the demagnetizing magnet parts 38 and the non-magnetic force parts 39 are formed in circular band-shape, the demagnetizing magnet parts 38 and the non-magnetic force parts 39 are able to be arranged in the first, second gaps with the same size, even if the demagnetizing rotating board 32 rotates.

On the other hand, the rotary power generating apparatus 100 has the repulsive force unequal structure concerning the first piston magnet member 60, the first fixed magnet member 70 and the second piston magnet member 61, the second fixed magnet member 71.

When the crankshaft 11 rotates, for example, as illustrated in FIG. 14 (a), the first crank part 11a inclines front side along to the rotating direction fa of the crankshaft 11, at the timing immediately after the first piston magnet member 60 reaches the top dead center. The first repulsive force always operates to the first piston magnet member 60. Therefore, the first repulsive force tries to regresses the first piston magnet member 60, even if the first piston magnet member 60 reaches the top dead center and the first crank part 11a rises vertically. However, moment is not able to be obtained, even if the repulsive force operates, when the first crank part 11a rises vertically, therefore the crankshaft 11 is difficult to rotate, accordingly the first piston magnet member 60 is difficult to regress.

However, in case of the repulsive force unequal structure, because the repulsive force of other part is more powerful than that of the hindmost part 79, front side of the first piston magnet member 60 along to the rotating direction of the crankshaft 11 is easy to regress, even if the first piston magnet member 60 reaches the top bottom center. Therefore, if the rotation of the crankshaft 11 continues due to its inertia to incline the first crank part 11a in front side, the first piston magnet member 60 is easy to regress, and the first piston magnet member 60 is more easily to regress with disappearance of the reducing operation to the repulsive force at the moment. Accordingly, continuity of the reciprocation, concerning the rotary power generating apparatus 100, is able to be more enhanced.

Further, because the demagnetizing magnet parts 38 have the magnetic force changing structure, when the demagnetizing rotating board 32 rotates clockwise, the repulsive force reducing operation is improved stepwise. Whereupon, the first, second repulsive force, which are improved in accordance with the progresses of the first, second piston magnet members 60, 61, are able to be reduced stepwise. Therefore, regresses of one of the first, second piston magnet members 60, 61 and progress of the other are performed surely, thereby the reciprocation is able to be performed surely.

Then the bevel gears 33, 11d are formed so that the first, second piston magnet members 60, 61 reciprocate one time respectively inside the first, second guide members 50, 51 during one rotation of the demagnetizing rotating board 32. Therefore, one rotation of the demagnetizing rotating board 32 is correlated with the half-process of the first piston magnet member 60 and the subsequent half-process of the second piston magnet member 61. Alternate regress of the first, second piston magnet members 60, 61 are able to obtained by the one rotation of the demagnetizing rotating board 32.

On the other hand, in the rotary power generating apparatus 100, the gap parts 53 are formed in the first, second guide members 50, 51. Frictional heat is generated due to friction with the first, second piston magnet members 60, 61 and the first, second guide members 50, 51 with the reciprocation of the first, second piston magnet members 60, 61. However, this frictional heat is able to be radiated outside of the first, second guide members 50, 51 from the gap parts 53.

In general, it is known that spontaneous magnetization of a ferromagnetic body is decreased exponentially with temperature increasing, magnetic character of the ferromagnetic body will be lost when the temperature exceeds the Curie temperature. Therefore, when frictional heat is generated to be stored in first, second piston magnet members 60, 61, there is a possibility that the magnetic forces of the permanent magnets 64, 74 are decreased. Whereupon, the first, second repulsive forces become weak, there is a possibility that reciprocation of the first, second piston magnet members 60, 61 is not able to be repeated.

Especially, as conventional technology, in case of where the piston magnet is accommodated inside the cylinder with a sealing up, frictional heat, according to friction of the piston magnet and the cylinder, is likely to be filled inside the cylinder, therefore temperature of the piston magnet is likely to be increased.

However, in case of the rotary power generating apparatus 100, because the gap parts 53 are formed in the first, second guide members 50, 51, heat such as frictional heat or the like is difficult to be filled. Accordingly, the decline of magnetic force of the permanent magnets 64, 74 is able to be prevented, and reciprocation of the first, second piston magnet members 60, 61 is able to be continued.

Then, in case of the rotary power generating apparatus 100, inclined angle of the fixed pole surfaces 70a, 71a, in the first, second fixed magnet members 70, 71, is able to be adjusted with adjusting members 75. Therefore, even if the inclined angle of the fixed pole surfaces 70a, 71a changes due to vibration or the like during operation, the inclined angle is able to be adjusted.

Note that the rotary power generating apparatus 100 can generate electric power by transmitting the above-described continuous rotary power of the crankshaft 11 to the internal motor generators 15a, 15b, therefore it can be utilized as electric generating apparatus. Of course, the rotary power can be utilized for other uses.

MODIFIED EXAMPLE 1

Figure 21:
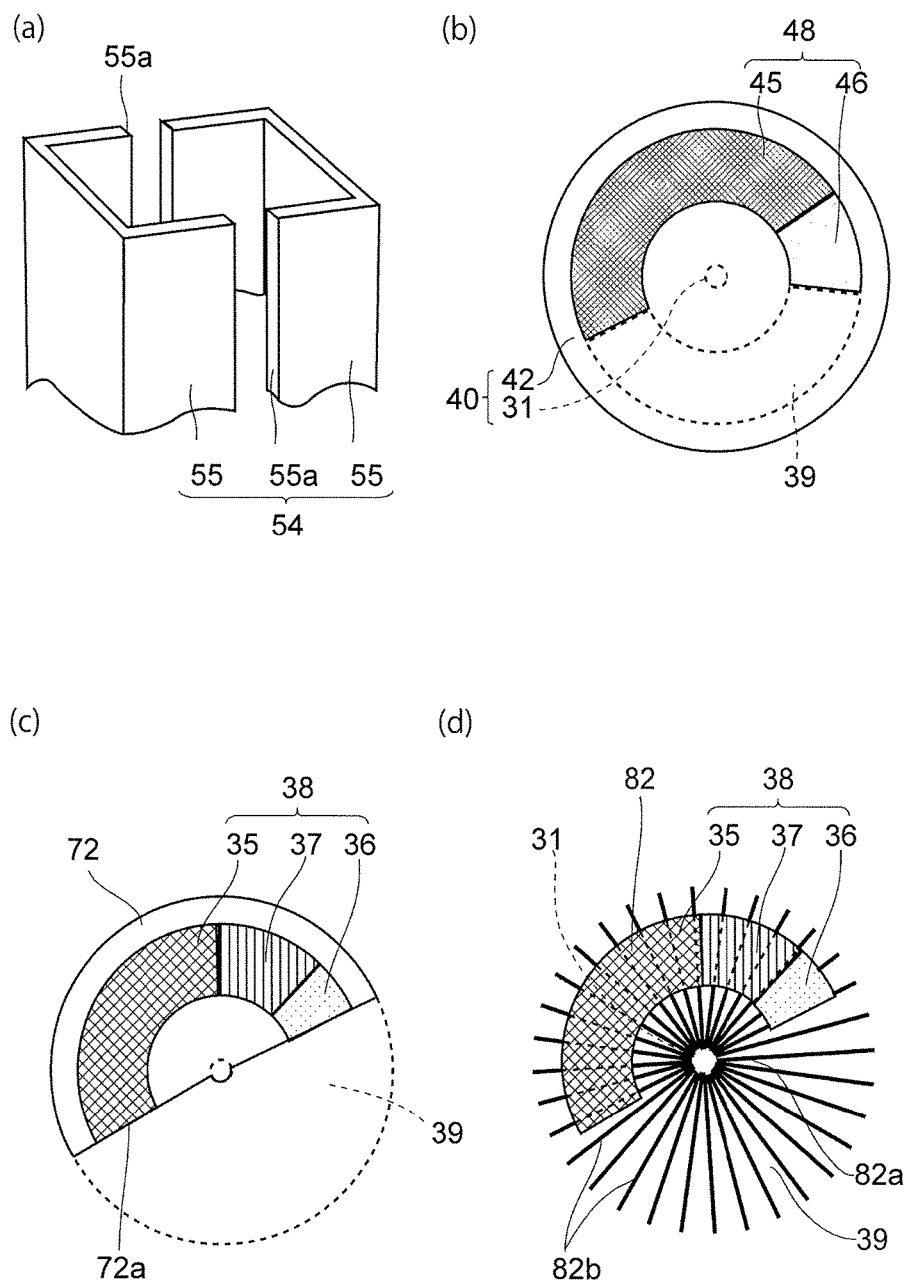
FIG. 21 (a) is a perspective view illustrating a guide member according to a modified example with a part thereof omitted, FIG. 21 (b) is a plan view of the demagnetizing member according to a modified example, FIG. 21 (c) is a plan view of the demagnetizing member according to another modified example, FIG. 21 (d) is a plan view of the demagnetizing member according to still another modified example.

FIG. 21 (a) is a perspective view illustrating a guide member 54 according to a modified example 1 with a part thereof omitted. The guide member 54 has two holding members 55 having almost c-figure shape in its cross section. Each holding member 55 is arranged separately so that gap parts 55a are formed. The guide member 54 can also guide first, second piston magnet members 60, 61, and radiate frictional heat to outside of the guide member 54, as the first, second guide members 50, 51.

Further, FIG. 21 (b) is a plan view of the demagnetizing member 40 according to the modified example 1. The demagnetizing member 40 is different from the demagnetizing member 30 in that the demagnetizing member 40 has a demagnetizing rotating board 42 instead of the demagnetizing rotating board 32. The demagnetizing rotating board 42 is different from the demagnetizing rotating board 32 in that the demagnetizing rotating board 42 has demagnetizing magnet parts 48 instead of the demagnetizing magnet parts 38. The demagnetizing magnet parts 48 are different from the demagnetizing magnet parts 38 in that the demagnetizing magnet parts 48 have strong demagnetizing parts 45 and weak demagnetizing parts 46, do not have middle demagnetizing parts. The strong demagnetizing parts 45 have similar magnetic forces with the strong demagnetizing parts 35, and they have larger size than the strong demagnetizing parts 35. The weak demagnetizing parts 46 are similar with the weak demagnetizing parts 36. The above-mentioned demagnetizing magnet parts 48 have also the magnetic force changing structure which the magnetic force changes so as to become strong gradually along the peripheral direction, similar with the demagnetizing magnet parts 38.

A part, having no magnetic force, of circular band-shaped part which the rotating shaft 31 is a center, is set as the non-magnetic force parts 39, in the demagnetizing rotating board 32. In this case, a part composed of non-magnetic member is the non-magnetic force parts 39 though, it is possible that circular band-shaped part is cut off from the demagnetizing rotating board 32 to form a hole part having circular band-shape and the hole part is set as the non-magnetic force parts 39.

Further, it is possible that the demagnetizing rotating board 72, illustrated in FIG. 21 (*c*), is able to be used instead of the demagnetizing rotating board 32. The demagnetizing rotating board 82, illustrated in FIG. 21 (*d*), is able to be used instead of the demagnetizing rotating board 32. The demagnetizing rotating board 72 is a board member, having almost half-size circular-shape, which a fan-like part, including the non-magnetic force parts 39, is cut off.

The demagnetizing rotating board 82 has a plurality of bone parts 82*a* extending radially from center part which the rotating shaft 31 is fixed, and the demagnetizing magnet parts 38 and non-magnetic force parts 39 are formed on the plurality of bone parts 82*a*. Further, spaces of adjacent bone parts 82*a* are gap parts 82*b*.

Note that the demagnetizing rotating board 82 includes a part composed of only a plurality of bone parts 82*a*, which is not formed with a board-like shape, however, a part, which the demagnetizing magnet parts 38 are formed, is formed with a board-like shape. In this embodiment, not only the member, which the whole part is formed with a board-like shape, such as the demagnetizing rotating board 32, but also the member, which the only one part is formed with a board-like shape such as the demagnetizing rotating board 82, are included in the demagnetizing rotating board.

The demagnetizing rotating boards 72, 82 have shapes which parts of demagnetizing magnet part 38 oppose at least one of the top pole surfaces 60*a*, 61 *a*. Further, because the demagnetizing rotating boards 72, 82 are lighter than the demagnetizing rotating board 32, they can be rotated with lower energy than the demagnetizing rotating board 32.

MODIFIED EXAMPLE 2

Figure 22:
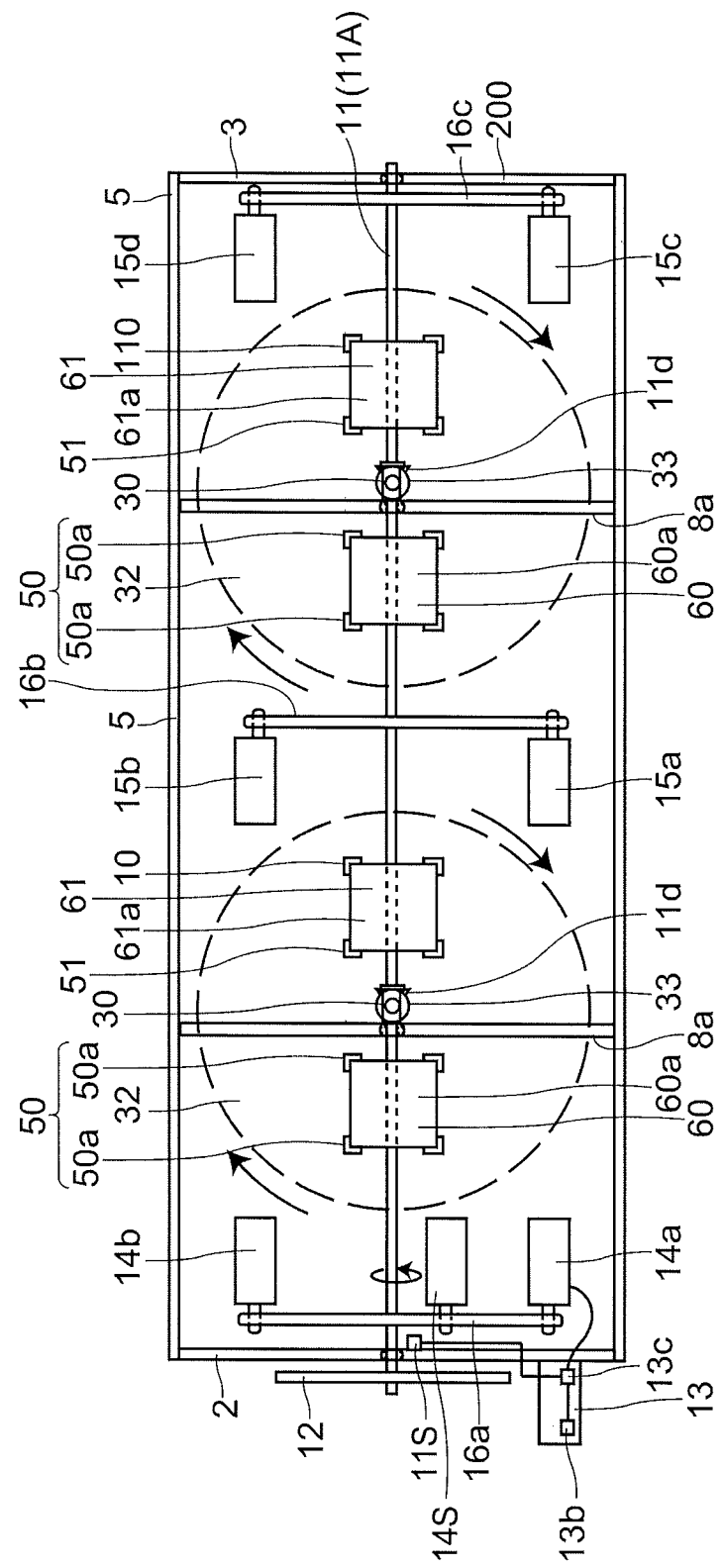
FIG. 22 is a plan view, similar with FIG. 3, illustrating the rotary power generating apparatus according to another modified example.

Subsequently, the rotary power generating apparatus 200, according to the modified example 2 will be explained with reference to FIG. 22. The rotary power generating apparatus 200 is different from the above-described the rotary power generating apparatus 100 in that the rotary power generating apparatus 200 has the engine part 110, motor generators 15*c*, 15*d* and belt 16*c*.

The engine part 110 has, similar with the above-described engine part 10, the crankshaft 11, the first, second guide members 50, 51, the first, second piston magnet members 60, 61, the first, second fixed magnet members 70, 71, the first, second connecting rods 80, 81 and the demagnetizing member 30. Further, the motor generators 15*c*, 15*d* have respectively common structure with the above-described motor generators 15*a*, 15*b*. The belt 16*c* has a common structure with the belt 16*b*.

Both of the engine part 10 and the engine part 110 of the rotary power generating apparatus 200 have respectively the crankshaft 11, the crankshaft 11 in the engine part 10, the crankshaft 11 in the engine part 110 constitute the one common crankshaft 11A, being common to both of them. Further, phases of the first, second piston magnet members 60, 61, in the respective engine parts 10, 110, are common each other.

Rotary power of the crankshaft 11 is obtained from reciprocation of the first, second piston magnet members 60, 61 in the engine part 10, in case of the above-described rotary power generating apparatus 100.

On the other hand, in case of the rotary power generating apparatus 200, the reciprocation of the first, second piston magnet members 60, 61 in the engine part 10 and the reciprocation of the first, second piston magnet members 60, 61 in the engine part 110 are performed with overlapping, the overlapping reciprocation rotates the crankshaft 11 (common crankshaft 11A). Therefore, rotary power of the crankshaft 11 (common crankshaft 11A) become more powerful than that of the rotary power generating apparatus 100.

MODIFIED EXAMPLE 3

Figure 23:
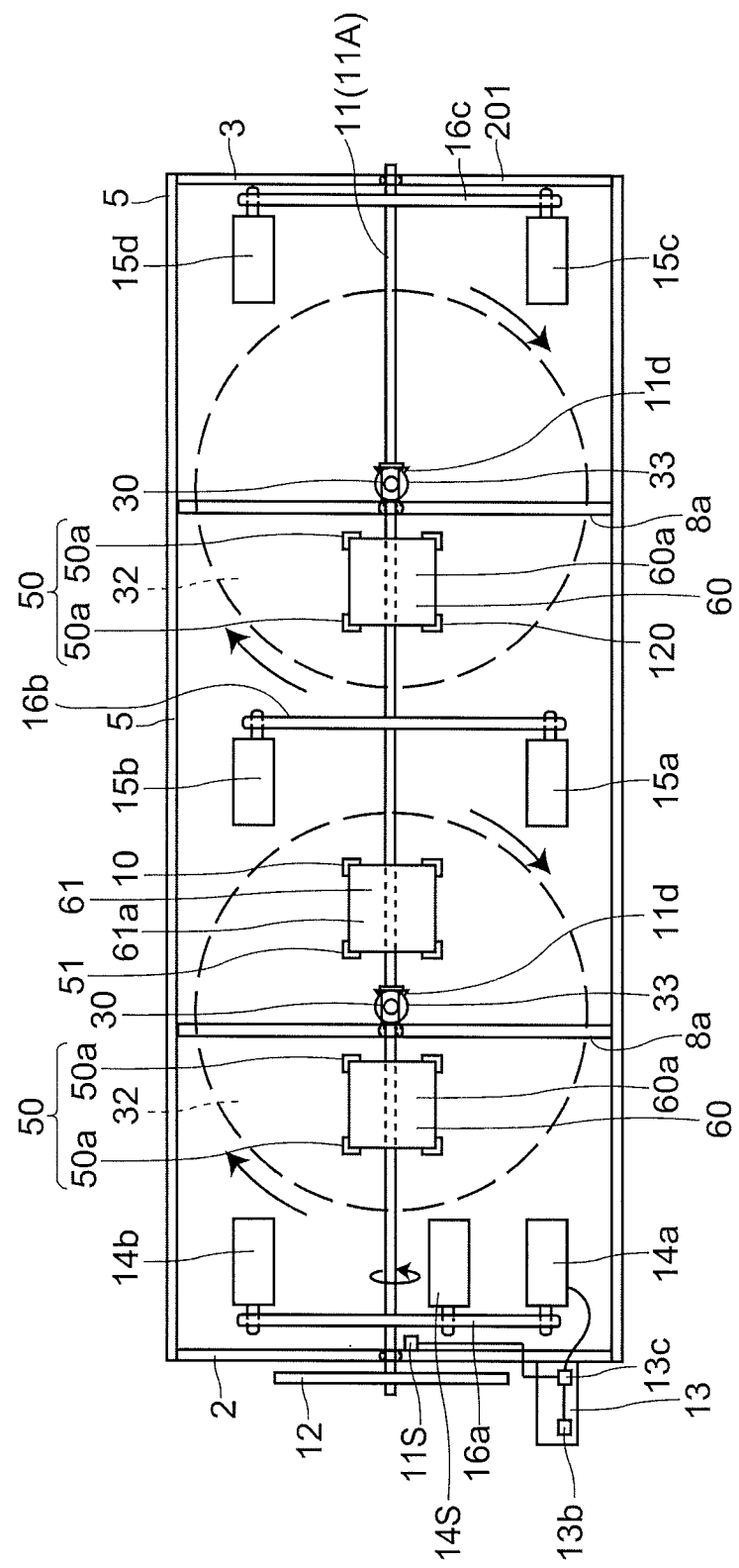
FIG. 23 is a plan view, similar with FIG. 3, illustrating the rotary power generating apparatus according to still another modified example.
Figure 24:
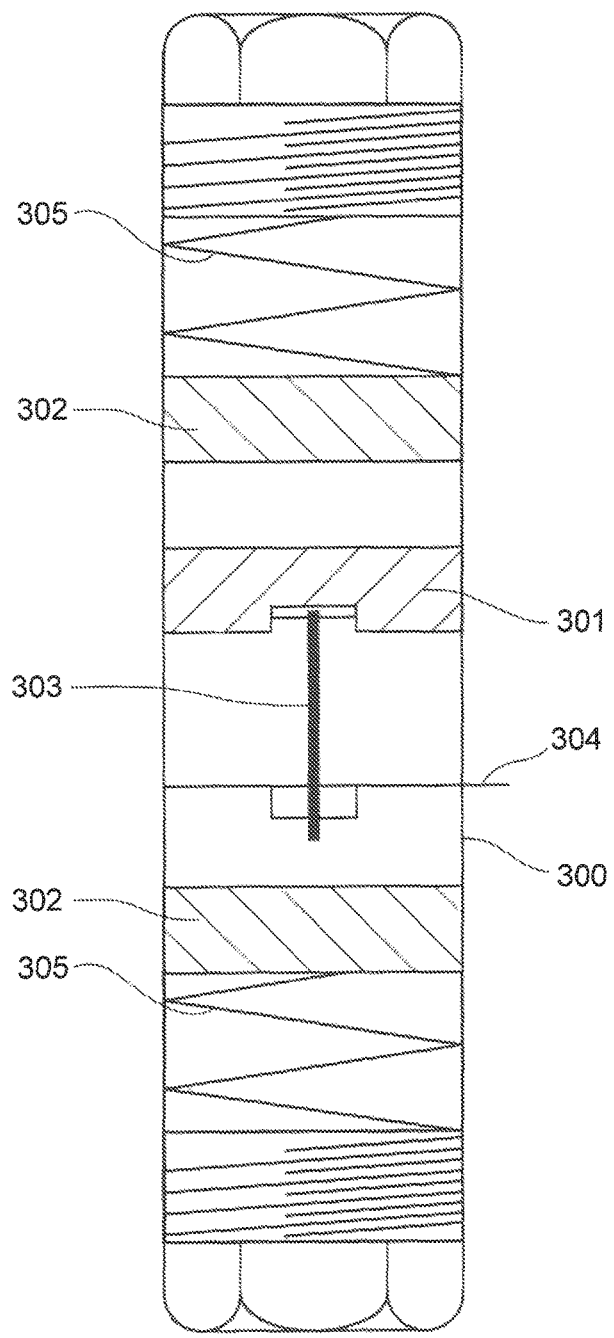
FIG. 24 is a view illustrating the conventional magnetic force movement apparatus.
Figure 26:
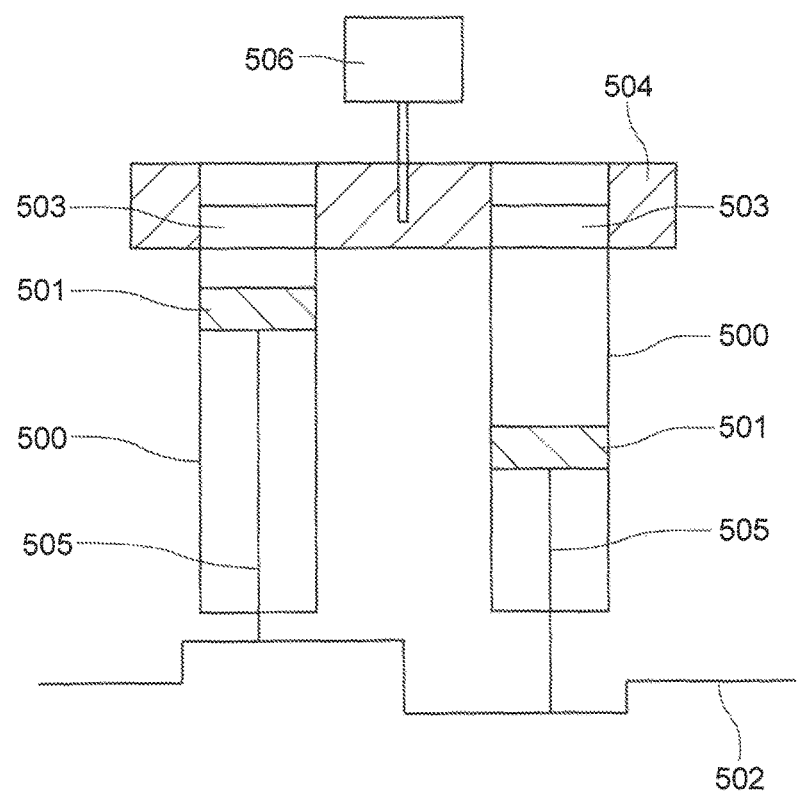
FIG. 26 is a view illustrating the conventional power transmitting machinery.
Figure 27:
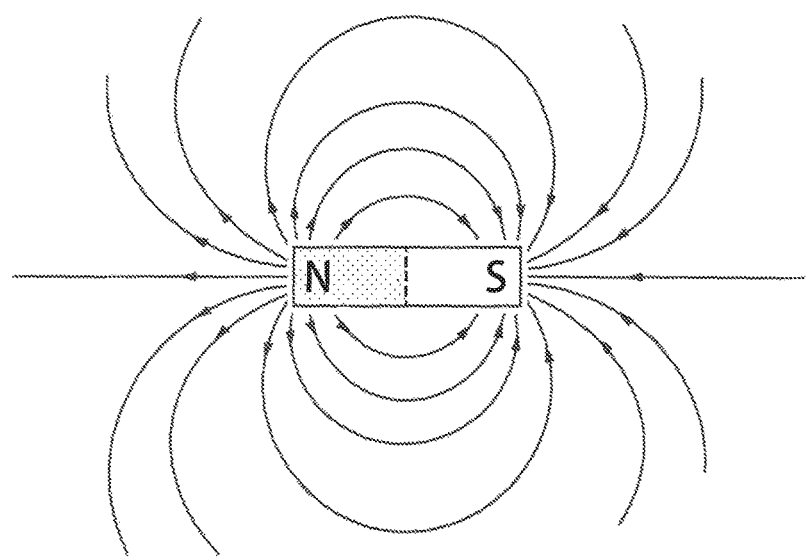
FIG. 27 is a view schematically illustrating the permanent magnet and lines of magnetic force appeared from it.
Figure 28:
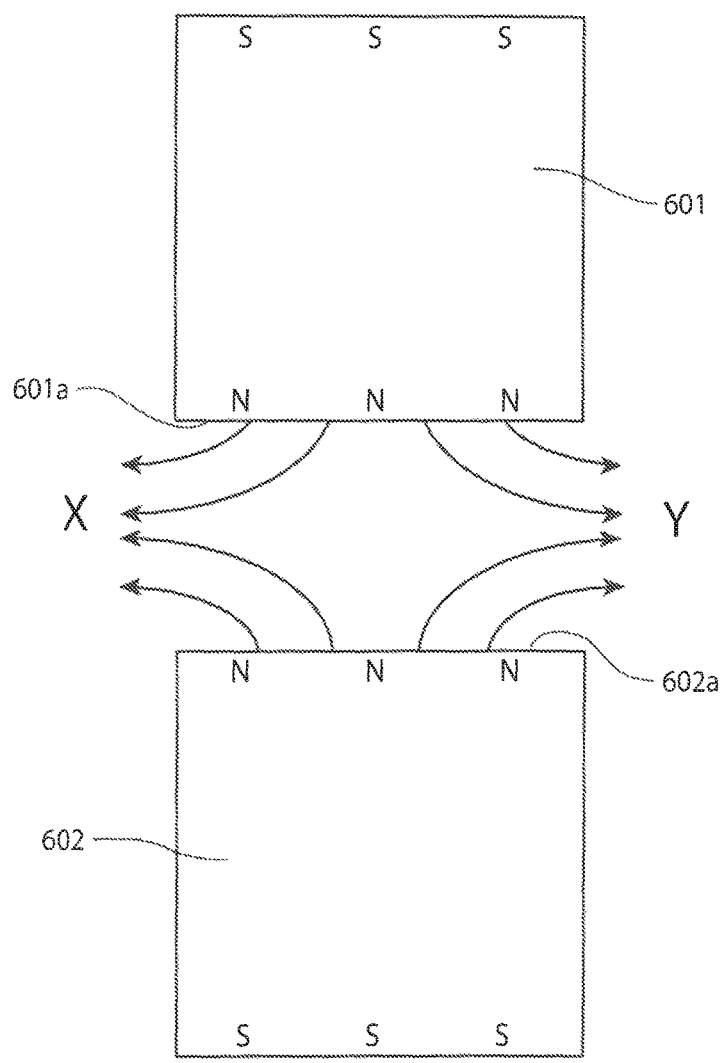
FIG. 28 is a view schematically illustrating the lines of magnetic force when the fixed magnet and the piston magnet are opposing in parallel.

Subsequently, the rotary power generating apparatus 201, according to the modified example 3 will be explained with reference to FIG. 23. The rotary power generating apparatus 201 is different from the above-described the rotary power generating apparatus 100 in that the rotary power generating apparatus 201 has the engine part 120, motor generators 15*c*, 15*d* and belt 16*c*.

The engine part 120 is different from the above-described engine part 10 in that the engine part 120 does not have the second guide member 51, the second piston magnet member 61, the second fixed magnet member 71 and the second connecting rod 81. Further, the motor generators 15*c*, 15*d* have respectively common structures with the above-described motor generators 15*a*, 15*b*. The belt 16*c* has a common structure with the belt 16*b*.

The rotary power generating apparatus 201 has also the one common crankshaft 11A, constituted of the crankshaft 11 in two engine parts 10, 210, similar with the rotary power generating apparatus 200. Further, phases of the first piston magnet members 60 in the respective engine parts 10, 110 are common each other.

In case of the rotary power generating apparatus 201, the reciprocation of the first piston magnet member 60 in the engine part 10 and the reciprocation of the first piston magnet member 60 in the engine part 120 are performed with overlapping, the overlapping reciprocation rotates the crankshaft 11 (common crankshaft 11A). Therefore, rotary power of the crankshaft 11 (common crankshaft 11A) become more powerful than that of the rotary power generating apparatus 100.

MODIFIED EXAMPLE 4

Figure 29:
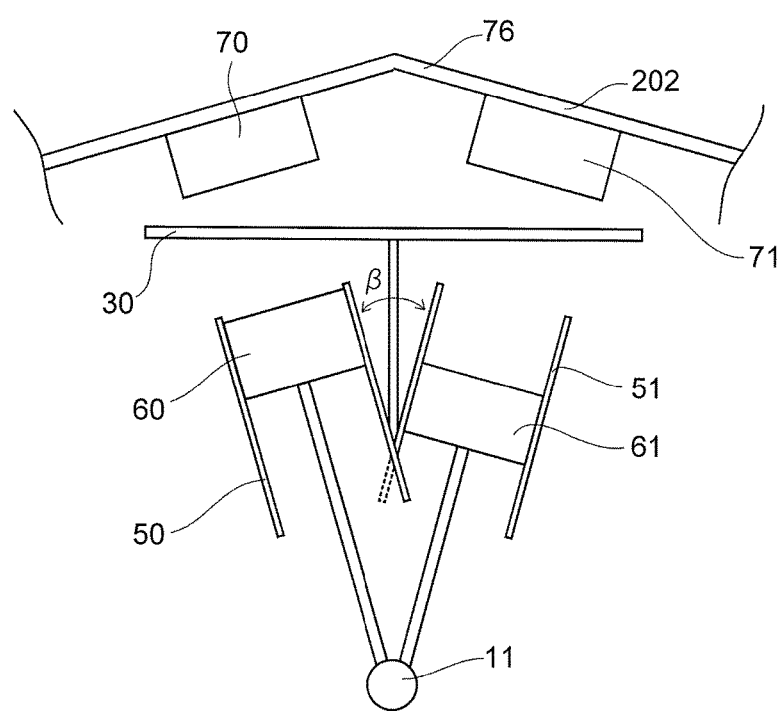
FIG. 29 is a side elevation view of the rotary power generating apparatus according to modified example of the present invention, seen from the direction along the crankshaft, with a part thereof omitted.

Subsequently, the rotary power generating apparatus 202, according to the modified example 4 will be explained with reference to FIG. 29. FIG. 29 is a side elevation view of the rotary power generating apparatus 202 according to modified example, seen from the direction along the crankshaft 11. In case of the rotary power generating apparatus 100, although the first, second guide members 50, 51 are arranged along the crankshaft 11 in series, in case of the rotary power generating apparatus 202, the first, second guide members 50, 51 are arranged with v-figure shape which forms a predetermined guide angle β along the crankshaft 11.

Then, the rotary power generating apparatus 202 has a slant lid part 76 which ascends from the side surface to the center, the first, second fixed magnet members 70, 71, similar with the rotary power generating apparatus 100, are fixed on the slant lid part 76. Further, the first, second guide members 50, 51 and the first, second piston magnet members 60, 61 are arranged so as to go toward the first, second fixed magnet members 70, 71.

The rotary power generating apparatus 202 has the demagnetizing member 30 with the above-mentioned the first, second guide members 50, 51, the first, second piston magnet members 60, 61 and the first, second fixed magnet members 70, 71. Therefore, the first, second piston magnet members 60, 61 perform the action of the half-process, having different direction, similar with the rotary power generating apparatus 100, the rotary power generating apparatus 202 shows the same operation and effect with the the rotary power generating apparatus 100.

The above description is a description concerning embodiments of the present invention, do not limit the apparatus and method of the present invention, and various modified examples can be carried out easily. Further, an apparatus or method constituted from proper combining of constitution elements, function, character, method or step in each embodiment, are included in the present invention, For example, the present invention includes not only the case having two motion units, including piston magnet member, fixed magnet member, guide member and connecting rod, like the rotary power generating apparatus 100, four motion units, three motion units, like the rotary power generating apparatus 200, 201, but also the case having five motion units, six motion units, more than motion units.

INDUSTRIAL APPLICABILITY

Application of the present invention provides reciprocations of the piston magnets surely and enhance the continuity, thereby the continuous rotary power is able to be obtained. The present invention is able to utilize in a field of the rotary power generating apparatus and electric generating apparatus which utilize it.

REFERENCE SIGNS LIST 10, 110, 120 . . . engine part, 11 . . . crankshaft, 11A . . . common crankshaft, 11d, 33 . . . bevel gear, 15a, 15b . . . motor generator, 30 . . . demagnetizing member, 31 . . . rotating shaft, 32, 72, 82 . . . demagnetizing rotating board, 32a . . . Slower surface, 32b . . . Supper surface, 35, 45 . . . strong demagnetizing part, 37 . . . middle demagnetizing part, 36, 46 . . . weak demagnetizing part, 38, 48 . . . demagnetizing magnet part, 39 . . . non-magnetic force part, 50 . . . first guide member, 51 . . . second guide member, 53 . . . gap part, 60 . . . first piston magnet member, 61 . . . second piston magnet member, 60a, 61a . . . top pole surface, 63 . . . holding case, 64, 74 . . . permanent magnet, 70 . . . first fixed magnet member, 70a, 71a . . . fixed pole surface, 71 . . . second fixed magnet member, 73 . . . for-fixing holding case, 75 . . . adjusting member, 79 . . . hindmost part, 80 . . . first connecting rod, 81 . . . second connecting rod, 100, 200, 201, 202 . . . rotary power generating apparatus.

The invention claimed is:

1. A rotary power generating apparatus comprising:
a first piston magnet member and a second piston magnet member arranged so that their polarities of magnetic poles of top pole surfaces of a top dead center side are equal;
a first connecting rod and a second connecting rod connected with the bottom dead center side of the respective first, second piston magnet members;
a crankshaft connected with the first, second connecting rods;
a first guide member and a second guide member, which hold respectively the first, second piston magnet members from outside and guide the respective first, second piston magnet members during all process of reciprocation;
a first fixed magnet member and a second fixed magnet member fixed on the positions to keep a constant interval from the top pole surfaces of the respective first, second piston magnet members, and in which fixed pole surfaces, having the same polarity with the magnetic pole of the top pole surfaces, are arranged so as to oppose the top pole surfaces of the respective first, second piston magnet members; and
a demagnetizing member arranged between the top pole surfaces of the first, second piston magnet members and the fixed pole surfaces of the first, second fixed magnet members, and having a demagnetizing rotating board opposing the top pole surfaces both of the first, second piston magnet members,
wherein the demagnetizing rotating board comprises demagnetizing magnet parts and non-magnetic force parts arranged both of a lower surface opposing the top pole surfaces and upper surface opposing the fixed pole surfaces,
wherein demagnetizing magnet parts having magnetic force weaker than the magnetic poles of the first, second piston magnet members and having different polarity from the top pole surfaces,
wherein the non-magnetic force parts, having no magnetic force, are formed adjacent to the demagnetizing magnet parts, and oppose to only one of the first, second piston magnet members;
wherein the rotary power generating apparatus comprising:
a repulsive force unequal structure which a hindmost interval, arranged hindmost position along a rotating direction which the crankshaft rotates, is spread than an interval of another part to weaken a repulsive force repulsing the top pole surfaces and the fixed pole surfaces in the hindmost position than the repulsive force in another part, in the top pole surfaces of the respective first, second piston magnet members and the fixed pole surfaces of the respective first, second fixed magnet members;
wherein the rotary power generating apparatus further comprising:
an auxiliary motor supplying power to the crankshaft so that reciprocation of the first, second piston magnet members become continuous;
wherein the demagnetizing magnet parts comprises a strong demagnetizing part having a strongest magnetic force, a weak demagnetizing part having a weakest magnetic force, a middle demagnetizing part having magnetic force in the middle of the strong demagnetizing part and the weak demagnetizing part, and a magnetic force changing structure which the strong demagnetizing part, middle demagnetizing part and weak demagnetizing part are arranged sequentially along the rotating direction of the demagnetizing rotating board so that the magnetic force changes to become strong gradually along the peripheral direction, and wherein the demagnetizing rotating board is formed so that the strong demagnetizing part and the non-magnetic force part oppose respectively one of the first, second piston magnet members.

2. The rotary power generating apparatus according to claim 1, wherein the demagnetizing member has a rotating shaft rotates the demagnetizing rotating board around the center, wherein the demagnetizing member comprises bevel gears formed on the edge part of the rotating shaft and the crankshaft respectively, and the bevel gears engage with each other, wherein the bevel gears are formed so that the first, second piston magnet members reciprocate respectively inside the first, second guide members during one rotating of the demagnetizing rotating board in the rotating shaft;

wherein the bevel gear of the demagnetizing member engages with the bevel gear of the crankshaft so that the second piston magnet member reaches the bottom dead center at the moment when the first piston magnet member reaches the top dead center, and immediately after that, in the demagnetizing rotating board, a part between the first piston magnet member and the first fixed magnet member changes from the demagnetizing magnet parts to the non-magnetic force parts, and the demagnetizing magnet parts are arranged between the second piston magnet member and the second fixed magnet member.

3. The rotary power generating apparatus according to claim 1, wherein the first, second guide members have a gap part, connecting inside with outside, formed in all range of reciprocation of the first, second piston magnet members.

4. The rotary power generating apparatus according to claim 1, wherein the demagnetizing rotating board comprises a circular band-shaped structure which the demagnetizing magnet parts and the non-magnetic force parts are formed in circular band-shape.

5. The rotary power generating apparatus according to claim 1, wherein the first, second piston magnet members respectively comprises holding cases having a size of being accommodated inside the first, second guide members, and permanent magnets being fitted inside the holding cases without gap, wherein the first, second fixed magnet members respectively comprises for-fixing holding cases having the same size with the holding cases, and permanent magnets being fitted inside the for-fixing holding cases without gap, wherein the first, second fixed magnet members are fixed with a adjusting member for adjusting a mounting state of the for-fixing holding cases.

6. The rotary power generating apparatus according to claim 1, wherein the rotary power generating apparatus comprising:

a first engine part, second engine part respectively having the first, second guide members, the first, second piston magnet members, the first, second fixed magnet members, the first, second connecting rods, the demagnetizing member and the crankshaft, the crankshaft of the first engine part and the crankshaft of the second engine part are formed with a common crankshaft being common to the first, second engine part.

7. An electric generating apparatus comprising:

a rotary power generating apparatus; and a generator, which generates an electric power with a rotary power generated by the rotary power generating apparatus, wherein the rotary power generating apparatus comprising:

a first piston magnet member and a second piston magnet member arranged so that their polarities of magnetic poles of top pole surfaces of a top dead center side are equal;

a first connecting rod and a second connecting rod connected with the bottom dead center side of the respective first, second piston magnet members;

a crankshaft connected with the first, second connecting rods;

a first guide member and a second guide member, which hold respectively the first, second piston magnet members from outside and guide the respective first, second piston magnet members during all process of reciprocation;

a first fixed magnet member and a second fixed magnet member fixed on the positions to keep a constant interval from the top pole surfaces of the respective first, second piston magnet members, and in which fixed pole surfaces, having the same polarity with the magnetic pole of the top pole surfaces, are arranged so as to oppose the top pole surfaces of the respective first, second piston magnet members; and a demagnetizing member arranged between the top pole surfaces of the first, second piston magnet members and the fixed pole surfaces of the first, second fixed magnet members, and having a demagnetizing rotating board opposing the top pole surfaces both of the first, second piston magnet members, wherein the demagnetizing rotating board comprises demagnetizing magnet parts and non-magnetic force parts arranged both of a lower surface opposing the top pole surfaces and upper surface opposing the fixed pole surfaces, wherein the demagnetizing magnet parts have magnetic forces weaker than the magnetic poles of the first, second piston magnet members and having different polarity from the top pole surfaces, wherein the non-magnetic force parts, having no magnetic force, are formed adjacent to the demagnetizing magnet parts, and oppose to only one of the first, second piston magnet members;

wherein the rotary power generating apparatus comprising: a repulsive force unequal structure which a hindmost interval, arranged hindmost position along a rotating direction which the crankshaft rotates, is spread than an interval of another part to weaken a repulsive force repulsing the top pole surfaces and the fixed pole surfaces in the hindmost position than the repulsive force in another part, in the top pole surfaces of the respective first, second piston magnet members and the fixed pole surfaces of the respective first, second fixed magnet members;

wherein the rotary power generating apparatus further comprising: an auxiliary motor supplying power to the crankshaft so that reciprocation of the first, second piston magnet members become continuous;

wherein the demagnetizing magnet parts comprises a strong demagnetizing part having a strongest magnetic force, a weak demagnetizing part having a weakest magnetic force, a middle demagnetizing part having magnetic force in the middle of the strong demagnetizing part and the weak demagnetizing part, and a magnetic force changing structure which the strong demagnetizing part, middle demagnetizing part and weak demagnetizing part are arranged sequentially along the rotating direction of the demagnetizing rotating board so that the magnetic force changes to become strong gradually along the peripheral direction, and wherein the demagnetizing rotating board is formed so that the strong demagnetizing part and the non-magnetic force part oppose respectively one of the first, second piston magnet members.

* * * * *